(12) United States Patent
Crist et al.

(10) Patent No.: US 11,694,259 B2
(45) Date of Patent: *Jul. 4, 2023

(54) AUTHORIZATION OF A TRADING STRATEGY ALGORITHM

(71) Applicant: TRADING TECHNOLOGIES INTERNATIONAL INC., Chicago, IL (US)

(72) Inventors: Jefferson Ale Crist, Glenview, IL (US); Daniel Lidor, Chicago, IL (US)

(73) Assignee: Trading Technologies International, Inc., Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/337,943

(22) Filed: Jun. 3, 2021

(65) Prior Publication Data
US 2022/0391976 A1 Dec. 8, 2022

Related U.S. Application Data

(63) Continuation of application No. 13/083,250, filed on Apr. 8, 2011, now Pat. No. 11,055,774.

(51) Int. Cl.
*G06Q 40/04* (2012.01)
*G06F 21/44* (2013.01)
*G06F 8/30* (2018.01)

(52) U.S. Cl.
CPC ............. *G06Q 40/04* (2013.01); *G06F 8/30* (2013.01); *G06F 21/44* (2013.01)

(58) Field of Classification Search
CPC ............ G06Q 40/04; G06F 8/30; G06F 21/44
See application file for complete search history.

(56) References Cited

U.S. PATENT DOCUMENTS

| 7,305,361 B2 | 12/2007 | Otero et al. |
| 7,533,407 B2 | 5/2009 | Lewis et al. |

(Continued)

FOREIGN PATENT DOCUMENTS

| JP | S62-190558 A | 8/1987 |
| JP | 2004-208256 A | 7/2004 |

(Continued)

OTHER PUBLICATIONS

K. Matsui and H. Sato, "A Comparison of Genotype Representations to Acquire Stock Trading Strategy Using Genetic Algorithms," 2009 International Conference on Adaptive and Intelligent Systems, Klagenfurt, Austria, 2009, pp. 129-134. (Year: 2009).*

(Continued)

*Primary Examiner* — Virpi H Kanervo
(74) *Attorney, Agent, or Firm* — McDonnell Boehnen Hulbert & Berghoff LLP

(57) ABSTRACT

Systems, methods, and computer-readable storage media are provided for authorizing a trading algorithm prior to execution of the trading algorithm. An example method includes receiving a trading algorithm definition associated with a unique identifier and sending the unique identifier to an algorithm server that is operable to execute programming code representing the trading algorithm. The unique identifier may be associated with a trader authorized to execute the programming code. The algorithm server may check the unique identifier prior to execution of the programming code to ensure that the trading algorithm has been authorized.

8 Claims, 18 Drawing Sheets

(56) References Cited

U.S. PATENT DOCUMENTS

| | | |
|---|---|---|
| 7,676,439 B2 | 3/2010 | Tattan et al. |
| 7,702,571 B2 | 4/2010 | Janowski et al. |
| 7,904,368 B2 | 3/2011 | Weinstein et al. |
| 8,442,885 B1 | 5/2013 | Carrie et al. |
| 2001/0001877 A1 | 5/2001 | French et al. |
| 2002/0046151 A1 | 4/2002 | Otero et al. |
| 2003/0069821 A1 | 4/2003 | Williams |
| 2007/0011081 A1 | 1/2007 | Bok et al. |
| 2007/0043650 A1 | 2/2007 | Hughes et al. |
| 2007/0043653 A1 | 2/2007 | Hughes et al. |
| 2007/0083456 A1* | 4/2007 | Akers .................... G06Q 40/04 705/37 |
| 2008/0208729 A1 | 8/2008 | Driscoll et al. |
| 2008/0288419 A1 | 11/2008 | Miles et al. |
| 2009/0089202 A1* | 4/2009 | Rowley ................. G06Q 40/04 705/37 |
| 2010/0250467 A1 | 9/2010 | Weinstein |
| 2010/0299283 A1 | 11/2010 | Bok et al. |
| 2010/0325032 A1 | 12/2010 | Bok et al. |
| 2011/0040668 A1 | 2/2011 | Lee et al. |
| 2011/0040669 A1 | 2/2011 | Lee et al. |
| 2012/0259759 A1 | 10/2012 | Crist et al. |

FOREIGN PATENT DOCUMENTS

| | | | |
|---|---|---|---|
| JP | 2010-231531 A | 10/2010 | |
| WO | WO-2005033897 A2 * | 4/2005 | ............. G06Q 30/08 |

OTHER PUBLICATIONS

G. Nuti, M. Mirghaemi, P. Treleaven and C. Yingsaeree, "Algorithmic Trading," in Computer, vol. 44, No. 11, pp. 61-69, 2011. (Year: 2011).*

International Search Report and Written Opinion of International Application No. PCT/US2012/032121, dated Aug. 28, 2012 (dated Sep. 14, 2012).

Pavlidis, et al. "Computational intelligence algorithms for risk-adjusted trading strategies," IEEE Conference on Evolutionary Computation, Singapore, 2007, pp. 540-547.

* cited by examiner

AUTHORIZATION OF A TRADING STRATEGY ALGORITHM

CROSS REFERENCE TO RELATED APPLICATIONS

This application is a continuation of U.S. patent application Ser. No. 13/083,250, filed Apr. 8, 2011, now U.S. Pat. No. 11,055,774, which is herein incorporated by reference in its entirety for all purposes.

BACKGROUND

An electronic trading system generally includes a client device in communication with an electronic exchange. The electronic exchange transmits market data to the client device. Market data includes, for example, price data, market depth data, and last traded quantity data. In some electronic trading systems, the client device sends trade orders to the electronic exchange. Alternatively or in addition, a server side device sends the trade orders to the electronic exchange. Upon receiving the trade order, the electronic exchange enters the trade order into an exchange order book and attempts to match quantity of the trade order with quantity of one or more contra-side trade orders.

Electronic exchanges have made it possible for an increasing number of participants to be active in a market at any given time. The increase in the number of potential market participants has led to, among other things, a more competitive market and greater liquidity. In the competitive environment of electronic trading, where every second or a fraction of second counts in intercepting trading opportunities, trading algorithms are beneficial for automating electronic trading.

BRIEF DESCRIPTION OF THE DRAWINGS

Certain examples are described with reference to the following drawings.

Figure 1:
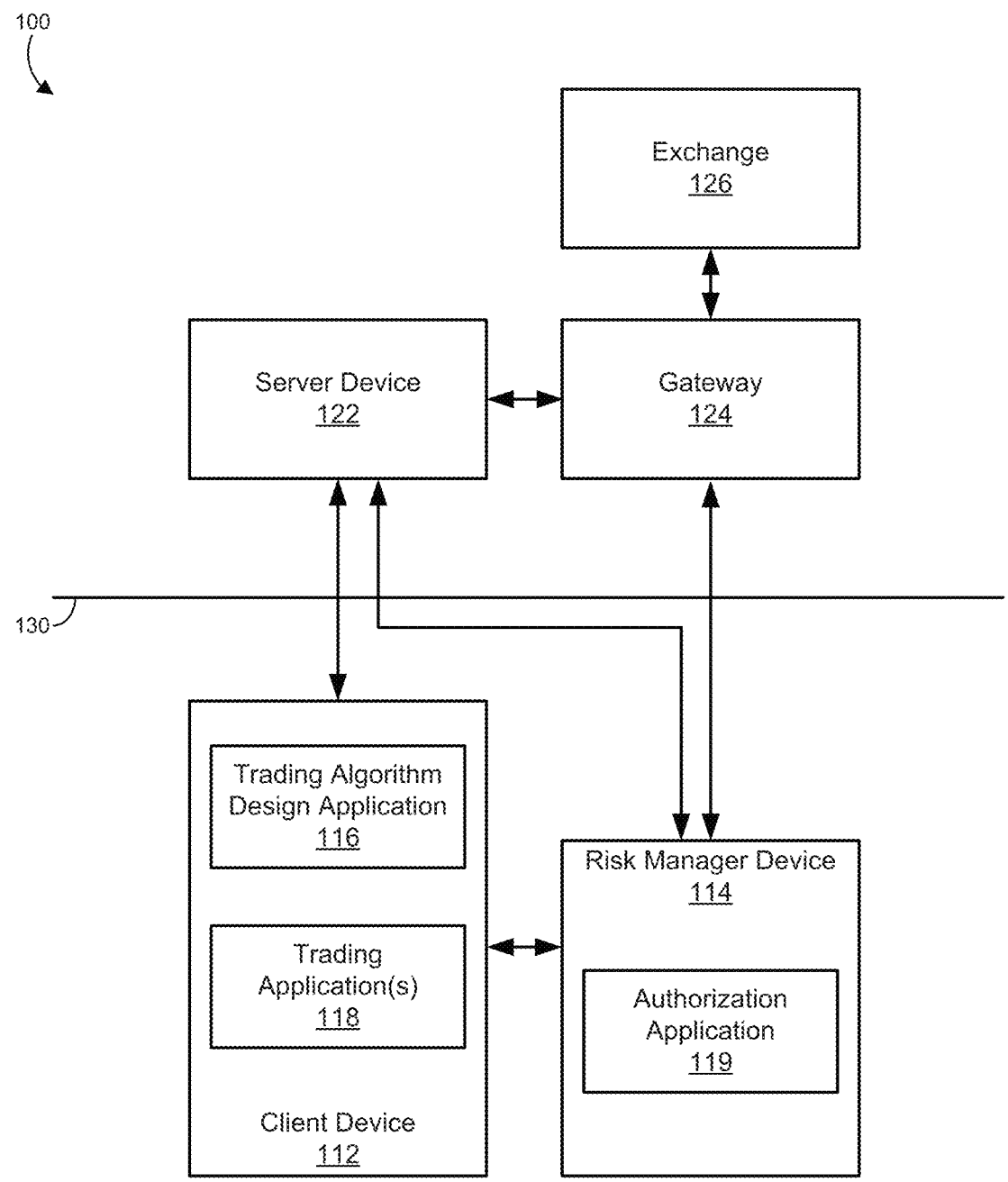
FIG. 1 illustrates an example electronic trading system in which certain example systems, apparatus, and/or methods may be employed.

The foregoing summary and the following detailed description will be better understood when read in conjunction with the drawings. The drawings show certain examples. It should be understood, however, that the examples are not limited to the arrangements and instrumentality shown in the attached drawings.

DETAILED DESCRIPTION

The disclosed examples relate to the authorization of a trading algorithm by a third-party (referred to herein as a "risk manager"), before programming code corresponding to that trading algorithm may be executed in a live environment.

Electronic trading applications enable a user (for example, a trader) to design a trading algorithm. Trading algorithms generally specify that certain trading actions should be taken when certain market conditions occur and/or are detected. Example trading actions include submitting, cancelling, and re-pricing an order.

Electronic trading applications may also, or instead, allow the user to upload the trading algorithm to a server device. The server device may automatically execute the trading algorithm. A user designing and/or facilitating execution of a trading algorithm may not have sufficient experience and/or interest to identify, weigh or appreciate the potential risks that a trading algorithm may create when the corresponding programming code is executed. Large sums of money and resources, along with liabilities associated with duties related to the corresponding funds, may be tied to each transaction implemented by the trade algorithm.

In some examples, a trading algorithm may be authorized before execution on the server device. Authorizing a trading algorithm may include employing a unique identifier of a trading algorithm and/or a definition of the trading algorithm. In some examples, the unique identifier is generated anytime a trading algorithm definition is saved, changed, and/or sent to the risk manager. Examples of unique identifiers include hash codes and globally unique identifiers (GUID). In some examples, the unique identifier changes at one or more times and/or in response to one or more events (for example, when the trading algorithm definition is saved). In some examples, changing the unique identifier prevents a trader from making changes to a trading algorithm after a risk manager has approved the trading algorithm. This prevents the trader from executing a trading algorithm that has not been approved.

Some examples may provide human oversight of trading algorithms, enable more experienced traders to monitor less experienced traders, and provide risk managers greater control over a portfolio of trading algorithms.

Some examples include, among other components, software executed on hardware. The examples are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, the disclosed examples may be implemented in other ways.

I. Brief Description

In an example, a method includes receiving, using a computing device, a trading algorithm definition corresponding to a trading algorithm designed using a trading algorithm design interface. The trading algorithm definition is to be used to execute a trading strategy. The example method includes receiving, using the computing device, a user input authorizing the trading algorithm definition to be executed on an algorithm server operable to execute programming code representing the trading algorithm. The example method includes sending, in response to receiving the user input, using the computing device, a unique identifier corresponding to the trading algorithm definition. The example unique identifier is associated with the programming code representing the trading algorithm and with a trader authorized to execute the programming code.

In an example, a tangible computer-readable storage medium includes instructions that, when executed, cause a computing device to accept a received trading algorithm definition corresponding to a trading algorithm designed using a trading algorithm design interface. The example instructions, when executed, cause the computing device to send, in response to receiving a user input authorizing the trading algorithm definition to be executed on an algorithm server, a unique identifier corresponding to the trading algorithm definition. The example unique identifier is associated with programming code stored to the algorithm server representing the trading algorithm and with a trader authorized to execute the programming code.

In an example, a tangible computer-readable storage medium includes instructions that, when executed, cause a computing device to implement a user interface operable to at least display a trading algorithm definition corresponding to a trading algorithm designed on a client computing device, to enable a risk manager to review the trading algorithm. The example user interface is operable to receive at least one user input authorizing the trading algorithm definition to be executed on an algorithm server, and requesting that a unique identifier corresponding to the trading algorithm definition be sent to the algorithm server. The example user interface is operable to send a notification to a device to be accessed by a user, indicating that the unique identifier has been sent to the algorithm server.

In an example, a method includes accepting a received approved trading algorithm, a received trader identifier, and a unique identifier corresponding to the approved trading algorithm. The example method includes determining in response to receiving an authorization identifier whether the authorization identifier corresponds to at least one of the trader identifier or the unique identifier. The example method includes executing, in response to the authorization identifier corresponding to at least one of the trader identifier or the unique identifier, programming code representing the approved trading algorithm. The example method includes rejecting, in responsive to the authorization identifier not corresponding to at least one of the trader identifier or the unique identifier, the programming code and sending a notification indicating that the programming code was not executed.

In an example, a tangible computer-readable storage medium includes instructions that, when executed, cause a computing device to at least accept a received approved trading algorithm. The example instructions, when executed, cause the computing device to store the approved trading algorithm, a trader identifier, and a unique identifier corresponding to the approved trading algorithm. The example instructions, when executed, cause the computing device to accept a received authorization identifier. The example instructions, when executed, cause the computing device to determine whether the authorization identifier corresponds to at least one of the trader identifier or the unique identifier. The example instructions, when executed, cause the computing device to, in response to the authorization identifier corresponding to at least one of the trader identifier or the unique identifier, execute programming code representing the approved trading algorithm. The example instructions, when executed, cause the computing device to, in response to the authorization identifier not corresponding to at least one of the trader identifier or the unique identifier, reject the programming code and send a notification indicating that the programming code was not executed.

II. Electronic Trading System

FIG. 1 illustrates an example electronic trading system 100 in which certain of the disclosed examples may be employed. The example trading system 100 of FIG. 1 includes a client device 112, a risk-manager device 114, a server device 122 (which may also be referred to as "server-side device" or "algorithm server"), a gateway 124, and an electronic exchange 126. The client device 112 and the risk-manager device 114 are in communication with each other and with the server device 122 and the gateway 124. The gateway 124 is in communication with the exchange 126. As used herein, the phrase "in communication with" includes direct communication and indirect communication through one or more intermediary components.

A. Client Device

The client device 112 is operable to send orders to buy or sell tradeable objects at the exchange 126. A user (for example, a trader) may utilize the client device 112 to send the orders. The orders are sent through the gateway 124 to the exchange 126. In addition, market data (for example, current prices, index values, etc.) is sent from the exchange 126 through the gateway 124 to the client device 112. The user may also utilize the client device 112 to monitor the received market data that may form the basis of a decision whether to send an order for a tradeable object.

As used herein, the term "tradeable object" refers to anything that may be traded with a quantity and/or a price. For example, tradeable objects include financial products such as stocks, options, bonds, futures, currency, warrants, funds derivatives, securities, commodities, traded events, goods, and combinations of these. A tradeable object may be real or synthetic. A real tradeable object includes products listed by an exchange. A synthetic tradeable object includes products defined by the user and not listed by an exchange. A synthetic tradeable object may include a combination of real (or other synthetic) products such as a synthetic spread created by a trader utilizing, for example, the client device 112.

The example client device 112 of FIG. 1 may be a computing device having a processor and memory. The client device 112 may include one or more electronic computing platforms such as a hand-held device, laptop, desktop computer, workstation with a single or multi-core processor, server with multiple processors, and/or cluster of computers. While depicted as a single device in FIG. 1, the client device 112 may include a trading terminal in communication with the server device 122 and/or a server other than the server device 122. The trading terminal may provide a trading screen to a user and may communicate commands to the server for further processing of the user's inputs (for example, commands for placing orders) through the trading screen.

The example client device 112 of FIG. 1 is generally owned, operated, controlled, programmed by, configured by, and/or otherwise used by a user. The term "user" refers to, but is not limited to, a human (for example, a trader) or an electronic trading device (for example, including a processor and memory or an algorithmic trading system). One or more users may, for example, be involved in the ownership, operation, control, programming, configuration, and/or other use of the client device 112.

The example client device 112 of FIG. 1 may include an electronic trading workstation, a portable trading device, an algorithmic trading system such as a "black box" or "grey box" system, an embedded trading system, and/or an automated trading tool. For example, the client device 112 may be a computing device running a copy of X_TRADER®, an electronic trading platform provided by Trading Technologies International, Inc. of Chicago, Ill. In some examples, the client device 112 may be a computing device running an automated trading tool such as AUTOSPREADER® and/or AUTOTRADER™, also provided by Trading Technologies International, Inc.

The example trading system 100 may include more than one client device 112. For example, multiple client devices similar to the client device 112 may be in communication with the gateway 124 to send orders to the exchange 126. The example client device(s) 112 may include one or more computing devices or processing components. In other words, the functionality of the client device(s) 112 may be performed by one computing device or more than one computing device. For example, one computing device may generate orders in association with the client device(s) 112 to be sent to the exchange 126 while another computing device may provide a graphical user interface to a trader in association with the client device 112.

1. Algorithm Design Application

With continued reference to the example in FIG. 1, the client device 112 is configured to execute a trading algorithm design application 116. The trading algorithm design application 116 may be stored in memory. A processor may retrieve and execute instructions related to the trading algorithm design application 116.

In some examples, the trading algorithm design application 116 may be stored to a portable computer-readable storage medium (for example, a compact disc), and the client device 112 may be configured to execute the trading algorithm design application 116 from the portable storage medium. In some examples, the trading algorithm design application 116 may reside on the server device 122 or a different server device and be moved or loaded to the client device 112 (for example, by downloading the trading algorithm design application 116 from a file or application device). These examples are illustrative, not limiting, and the example client device 112 of FIG. 1 may be configured in various other ways to execute the example trading algorithm design application 116.

The trading algorithm design application 116 may provide a visual design lab having and/or associated with a graphical user interface, an example being ADL™ (which may be referred to Algo Design Lab), provided by Trading Technologies International, Inc. of Chicago, Ill. Various embodiments of ADL are described in U.S. patent application Ser. No. 12/905,709, filed on Oct. 15, 2010, which is incorporated herein by reference in its entirety.

A visual design lab may include a trading interface according to certain embodiments. The trading interface is a trading interface for an algorithmic trading application referred to as ADL. The ADL allows a trader to design an algorithm for electronic trading. However, it should be understood that elements of the illustrated trading interface may be incorporated into other trading interfaces.

A trading interface may include a design canvas area, a block list area, a variable area, and a control area. In certain examples, one or more of these areas may be in separate windows or toolbars. For example, the block list area may be in a separate window from the design canvas areas. The design canvas area provides a visual programming environment for designing the algorithm. Designing an algorithm may include building, testing, simulating, and/or evaluating the algorithm. Default values for user-defined variables in the algorithm may be specified using the variable area. A parameter may be an input to the trading algorithm. A parameter may be a variable-value type. A parameter may be changed, for example, prior to or during execution of a trading algorithm.

The example trading algorithm design application 116 may enable a user to design, at least in part, a trading algorithm, which may be used to facilitate, for example, automated electronic trading. A trading algorithm may specify that certain trading actions should be taken when certain market conditions occur and/or are detected. Example trading actions include submitting, cancelling, and re-pricing an order. When the trading algorithm is launched on the client device 112 (for example, by a user using a trading tool), the server device 122 begins to execute the programming code representing the trading algorithm. The server device 122 may receive market data from the exchange 126 and monitor an electronic market. Based on information in the electronic market, the server device 122 may perform the trading actions specified in the trading algorithm when suitable conditions occur and/or are detected.

A trading algorithm is specified by a trading algorithm definition. A trading algorithm definition may define the design of a trading algorithm and enable the trading algorithm to be saved and viewed, for example, at a later time and/or on one or more different computing devices. In addition, the trading algorithm definition may enable the trading algorithm to be viewed (for example, graphically) using the trading algorithm design application 116. For example, graphical representations may be selected, manipulated, and/or placed using an interface in relation to other graphical representations to provide a trading algorithm definition. The trading algorithm definition includes logic expressions and parameters that describe the trading algorithm to be used in trading. Logic expressions specify the relationship between trading algorithm parameters and may generate more parameters. Parameters may include, for example, inputs into the logic expressions of the trading algorithm. The parameters may be variables.

With continued reference to the example in FIG. 1, the example trading algorithm design application 116 may at least in part specify the trading algorithm definition. The trading algorithm design application 116 may enable a user to specify parameters to be used by predefined logic expressions. In some examples, the trading algorithm design application 116 may enable a user to specify some or all of the logic expressions and some or all of the parameters. A trading algorithm for which a user specifies logic expressions is a user-defined trading algorithm.

Based on the trading algorithm definition, instructions or logic may be generated. Instructions or logic are herein referred to as programming code. Programming code may, for example, be source code, intermediate-language code, or machine-executable instructions. Generation of programming code may include, for example, compilation of generated source code or intermediate language code. Once programming code is generated, the programming code may be simulated and/or used to trade according to the defined trading algorithm.

The example trading algorithm design application 116 may generate a trading algorithm, a trading algorithm definition, and/or programming code associated with the trading algorithm.

2. Trading Application

The client device 112 may be configured to execute one or more trading applications 118. The trading application(s) 118 generally enable, assist with, and/or facilitate electronic trading. Example trading applications may provide trading tools that include, but are not be limited to, charts, trading ladders, order entry tools, automated trading tools, automated spreading tools, risk management tools, order parameter tools, order entry systems, market grids, fill windows, and market order windows, combinations thereof, and/or other electronic tools used for trading, preparing to trade, or managing trades.

The trading application(s) 118 may process market data by arranging and displaying the market data in trading and charting windows on one or more presentation devices associated with the client device 112. The market data may be received from the exchange 126 and/or a simulation environment that provides historical data and/or simulates an exchange but does not effectuate real-world trades. This processing may be based on user preferences. The trading application(s) 118 may include an automated trading tool such as an automated spread trading tool. The trading application(s) may be distributed across one or more of the computing devices of the client device 112. In some examples, certain components of a trading application are executed on a trading workstation and other components of the trading application are executed on a server in communication with the workstation.

The trading application(s) 118 may be stored to a memory of the client device 112. Certain components of the trading application(s) 118 may be stored on a trading workstation and other components of the trading application(s) 118 may be stored on a server in communication with the workstation. In certain examples, one or more components of the trading application(s) 118 may be loaded into the computer readable medium of the client device 112 from another computer readable medium. In some examples, the trading application(s) 118 (or updates to the trading application(s) 118) may be stored by a manufacturer, developer, or publisher on one or more CDs or DVDs, which are then provided to someone responsible for loading the application onto the client device 112 or to a server from which the client device 112 retrieves the trading application(s) 118. In some examples, the client device 112 receives the trading application (or updates to the trading application) from a server (for example, through the Internet or an internal network). The client device 112 may receive a trading application or an update to the trading application when requested by the client device 112 (for example, using "pull distribution") and/or un-requested by the client device 112 (for example, using "push distribution").

The trading application(s) 118 may create and/or send a trade order. A trade order is a message including an order to buy or sell a tradeable object, for example, at a particular price and/or a particular quantity. In some examples, the trading application(s) 118 may calculate one or more parameters for a trade order and automatically send the trade order. In some examples, the trading application(s) 118 may prepare the trade order to be sent but not actually send it without confirmation from the user.

The client device 112 may include a display device to present a text-based or graphical interface of the trading application(s) 118 to a user. Example display devices include computer monitors, hand-held device displays, projectors, and/or televisions. A user interface may be displayed on the display device. The user interface may be used by the user to specify or review parameters for an order using a trading application.

The client device 112 may include one or more input devices for receiving input from a user. Example input devices include a keyboard, trackball, two or three-button mouse, and/or touch screen. The client device 112 may include other devices for interacting with a user. For example, information may be aurally provided to a user through a speaker and/or received through a microphone.

The trading application(s) 118 may generate one or more trading screens to enable a trader to interact with one or more markets. Trading screens may enable traders to obtain and view market information, set order entry parameters, enter and cancel orders, and/or monitor positions while implementing various trading strategies, for example. For example, the trading application(s) 118 may receive market data (such as bid prices, bid quantities, ask prices, ask quantities, prices and quantities for past sales, and/or other market related information) from the exchange 126 of FIG. 1 which, in turn, may be displayed with a user interface of client device 112. Based on the received information, the trading screen(s) may display a range of price levels and corresponding bid and ask quantities for the price levels in regard to tradeable objects, for example. The information may be continuously or regularly provided to the trading application(s) 118, which enables the trading application(s) 118 to update the trading screen(s) with current market information. A trader may use the trading screen to place buy and sell orders for tradeable objects or to otherwise trade the tradeable objects based on the displayed information, for example.

B. Risk Manager Device

Authorizing a trading algorithm generally includes requiring approval from a person other than a user who designs and/or facilitates execution of the trading algorithm in a live environment. In some example systems, such a designated approver is referred to as a risk manager. For example, the risk manager may be a manager, administrator, experienced trader, or government official. In some examples, the risk manager refers to a plurality of reviewing individuals and/or devices that form reviewing groups or teams.

With continued reference to the example in FIG. 1, the system 100 includes a risk manager device 114. The risk manager device 114 may enable a risk manager to review and/or approve the trading algorithm. The risk manager device 114 may be authorized to review and/or approve the trading algorithm independent of the human risk manager. For example, the risk-manager device 114 may be a computing device configured to, among other things, execute an authorization application 119 that enables a risk manager to review and/or approve a trading algorithm. In some examples, the authorization application 119 is configured to review and/or approve the trading algorithm without intervention from the risk manager. For example, the authorization application 119 may automatically review and/or approve the trading algorithm with no or minimal input from the risk manager. In some examples, the authorization application 119 may be configured to analyze the trading algorithm and present an analysis of the trading algorithm (for example, through a user interface of the risk manager device 114) to a risk manager, who may then approve or reject the trading algorithm using a user interface of the risk manager device 114 and/or of the authorization application 119. These examples are illustrative, and the described example risk-manager devices may be implemented in additional or alternative manners.

The risk manager device 114 is in communication with the client device 112, the server device 122, and the gateway 124. In some examples, the risk-manager device 114 need not be in communication with the server device 122 and/or the gateway 124 and, instead, may be in communication only with the client device 112. The example risk manager device 114 may be configured to execute one or more trader applications (for example, X_TRADER) and/or trading algorithm design tools (for example, ADL). In some examples, the trader application(s) and/or trading algorithm design tool(s) may be configured to function as the authorization application 119.

The example risk manager device 114 of FIG. 1 may be configured to receive information relating to a designer and/or user of a trading algorithm (for example, a trader to be authorized or refused access to the trading algorithm). Information relating to a designer and/or user of a trading algorithm may include, for example, a trader identifier and/or trader experience level. The risk manager device 114 may be configured to receive information relating to the trading algorithm and/or trading algorithm definition. Information relating to the trading algorithm and/or trading algorithm definition may include, for example, a trading algorithm, trading algorithm definition, unique identifier of a trading algorithm and/or trading algorithm definition, and programming code corresponding to a trading algorithm. The risk manager device 114 may receive information relating to the trading algorithm, the trading algorithm definition, the designer and/or user of the trading algorithm, or any combination of this information from the client device 112 and/or from another device. The risk manager device 114 may receive the information in any suitable manner. In some examples, a trader sends an e-mail to the example risk-manager device 114 that includes information relating to the trader and/or a trading algorithm, and the risk manager then uses software running on the risk-manager device 114 (for example, the authorization application 119) or another device to download the information. In some examples, software on the risk-manager device 114 (for example, the authorization application 119) imports the information from the e-mail without intervention from the risk manager. In some examples, a trader uploads information to a server, a shared website, or a central repository, and the risk manager then uses software (for example, the authorization application 119) associated with the risk-manager device 114 or any other suitable device to retrieve the information from the server, shared website, or repository. In some examples, software (for example, the authorization application 119) associated with the example risk-manager device 114 imports the information without intervention from the risk manager.

The risk manager device 114 may receive the information as one or more files. In some examples, the risk manager device 114 may receive one or more files (for example, an ".algo" file or a ".str" file). In some example, the risk manager device 114 receives a container file containing multiple files. In some examples, a first file includes information relating to a trading algorithm, and a second file includes a unique identifier of the trading algorithm. The first file may be independent of (e.g., different than) the second file. In some examples, a first item of information is embedded in a file relating to a second item of information. For example, the risk-manager device 114 may receive a trading algorithm file, in which there is embedded a unique identifier of the trading algorithm to be reviewed, as disclosed in greater detail below.

C. Gateway

In the illustrated example of FIG. 1, orders from the client device 112 are sent to the exchange 126 through the gateway 124. The client device 112 may communicate with the gateway 126 using, for example, a local area network, a wide area network, a virtual private network, a T1 line, a T3 line, an ISDN line, a point-of-presence, the Internet, or a combination of these. The gateway 124 communicates with, and facilitates communication between, the client device 112 and the exchange 126. For example, the gateway 124 may receive orders from the client device 112 and transmit the orders to the exchange 126. For example, the gateway 124 may receive market data from the exchange 126 and transmit the market data to the client device 112.

The gateway 124 may perform processing on data communicated between the client device 112 and the exchange 126. For example, the gateway 124 may process an order received from the client device 112 into a data format acceptable by the exchange 126. The gateway 124 may transform market data in an exchange-specific format received from the exchange 126 into a format understood by the client device 112. The processing of the gateway 124 may include tracking orders from the client device 112 and updating the status of the orders based on fill confirmations received from the exchange 126. In some examples, the gateway 124 coalesces market data from the exchange 126 and provides the coalesced market data to the client device 112. In some examples, the gateway 124 provides services other than processing data communicated between the client device 112 and the exchange 126. For example, the gateway 124 may provide risk processing.

The example trading system 100 may include more than one gateway 124. For example, multiple gateways similar to the gateway 124 may be in communication with the client device 112 and/or the exchange 126. Such an arrangement may be used to provide, among other things, scalability, load balancing, and redundancy, should one or more gateways fail.

The gateway 124 may be a computing device including a processor and memory. The gateway 124 may include one or more electronic computing platforms such as, for example, a hand-held device, laptop, desktop computer, workstation with a single or multi-core processor, server with multiple processors, and/or cluster of computers.

The gateway 124 may include one or more gateway applications. The gateway application(s) may, for example, handle order processing and market data processing. This processing may be based on user preferences, for example.

The gateway 124 may communicate with the exchange 126, for example, through a local area network, a wide area network, a virtual private network, a T1 line, a T3 line, an ISDN line, a point-of-presence, the Internet, or a combination of these.

The gateway 124 may be part of the example client device 112. For example, the components of the gateway 124 may be part of the same computing platform as the client device 112. In some examples, one or more aspects of the functionality of the gateway 124 may be performed by one or more components of the client device 112. In some examples, the example trading system 100 may not include the gateway 124 and/or involve examples in which the gateway 124 is circumvented. Such an arrangement may occur when the client device 112 does not need to utilize the gateway 124 to communicate with the exchange 126. The client device 112, for example, may be adapted to communicate directly with the exchange 126. The gateway 124 may be located at the same physical site as the client device 112 or the exchange 126 or at a site physically separate from both the client device 112 and the exchange 126.

D. Server Device

With continued reference to the example in FIG. 1, the example system 100 includes a server device 122. The server device 122 may include a computing device having a processor and memory. The server device 122 is, but need not be, collocated with the exchange 126. For example, the server device 122 may be a server that is physically located at, near, or in the exchange 126. The server device 122 may be adapted to work trade orders with the exchange 126, for example, in accordance with a trading algorithm. Working an order may include submitting an order, re-quoting an order, cancelling an order, sending a hedge order, managing an outstanding order, or any combination thereof. Outstanding orders are orders that have been submitted to an exchange system but have not been filled. The exchange 126 may attempt to match all or some of an outstanding order with a contra-side order. Managing an outstanding order may include, for example, reporting back to the client device, tracking market updates, or otherwise performing one or more trading functions. An example of a server device is a server running a server-based spreader, such as Autospreader® Strategy Engine (ASE), which is provided by Trading Technologies International, Inc. An ASE may enhance the performance of a client-based spreader, such as Autospreader®, which is also provided by Trading Technologies International, Inc.

The server device 122, among other things, is configured to execute programming code corresponding to trading algorithms. The server device 122 may execute programming code corresponding to a trading algorithm in a live environment. A live environment generally refers to an environment other than a simulation environment.

The server device 122 is configured to receive a trading algorithm, programming code corresponding to the trading algorithm, one or more identifiers corresponding to the programming code and/or trading algorithm, or any combination thereof. Such information may be stored to the server device 122. For example, the server device 122 may have one or more processors and one or more processor-readable media for storing such information.

E. Exchange

The example system 100 includes an exchange 126, which is adapted to provide market data. The market data may, for example, be provided to the client device 112. The market data may be provided to the client device 112 through the gateway 124. The market data may include data that represents the inside market, which is the lowest sell price (which may be referred to as the "best ask") and the highest buy price (which may be referred to as the "best bid") at a particular time. The market data may also include market depth. Market depth may refer to the quantities available at the inside market and/or may also refer to quantities available at other prices away from the inside market. The market data may, for example, also include information such as the last traded price (LTP), the last traded quantity (LTQ), and order fill information.

The exchange 126 matches orders to buy and sell tradeable objects. The tradeable objects may be listed for trading by the exchange 126. In the example of FIG. 1, the orders may include orders received from the client device 112. Orders may be received from the client device 112 through the gateway 124. Additionally or alternatively, the orders may be received at the exchange 126 from other devices in communication with the exchange 126. For example, the exchange 126 may be in communication with a plurality of client devices (which may be similar to client device 112) that also provide orders to be matched.

In general, the exchange 126 may include a computing device having a processor and memory. The exchange 126 may be owned, operated, controlled, and/or used by an exchange entity. Example exchange entities include the CME Group, the London International Financial Futures and Options Exchange ("LIFFE"), the IntercontinentalExchange ("ICE"), and Eurex. The exchange 126 may be an electronic matching system, such as a computer, server, or other computing device, that is adapted to enable tradeable objects, for example, offered for trading by the exchange 126, to be bought and sold.

The example trading system 100 may include more than one exchange 126. For example, the gateway 124 may be in communication with multiple exchanges similar to the exchange 126. Such an arrangement may enable the client device 112 to trade at more than one exchange through the gateway 124.

For clarity, other devices have not been shown in connection with the example trading system 100. However, the example system 100 of FIG. 1 may include additional or alternative devices or components such as middleware, firewalls, hubs, switches, routers, exchange-specific communication equipment, modems, security managers, encryption devices, etc.

III. Authorization

In some examples, a process of authorizing a trading algorithm employs a unique identifier of a trading algorithm and/or the trading algorithm definition. A unique identifier may be an identifier that is unique to a given trading algorithm and/or trading algorithm definition. For example, a unique identifier may include information sufficient to distinguish a given trading algorithm and/or trading algorithm definition from another trading algorithm and/or trading algorithm definition. A unique identifier may also, or instead, be unique to a given version of a trading algorithm and/or trading algorithm definition. For example, a unique identifier may include information sufficient to distinguish the version of a trading algorithm and/or trading algorithm definition from another trading algorithm and/or trading algorithm definition.

An example of a unique identifier is a hash code generated based on the trading algorithm, the definition of the trading algorithm, and/or the programming code corresponding to the trading algorithm. A hash code generally results from a hash function. A hash function is generally a well-defined procedure or mathematical function that converts a variable-sized amount of data into the hash code. Hash functions include, but are not limited to, MD5 and SHA-1. In some examples, the unique identifier is a random or pseudorandom series of numbers and/or letters. Example unique identifiers include universally unique identifiers (UUID) and globally unique identifiers (GUID). For example, a GUID may be created by "myGuid=Guid.NewGuid( );" in .NET framework. Other functions, libraries, or frameworks may provide mechanisms that can be used to create GUIDs as well.

A unique identifier may be generated at one or more times and/or in response to one or more events. For example, a unique identifier may be generated anytime a trading algorithm definition is saved or changed. In some examples, a unique identifier is generated just before a trading algorithm, trading algorithm definition and/or unique identifier is sent to the risk manager. In some examples, a unique identifier is generated when a trading algorithm definition is uploaded to the risk manager.

In the illustrated example of FIG. 1, the unique identifier may be generated by the client device 112, the risk-manager device 114, the server device 122, and/or any other suitable device. For example, the client device 112 may generate a unique identifier when a user of the client device 112 modifies the corresponding trading algorithm definition. In some examples, the risk-manager device 114 generates a unique identifier when the risk manager approves the trading algorithm definition. In some examples, the server device 122 generates a unique identifier when the server device 122 receives an approved trading algorithm, an approved trading algorithm definition, and/or programming code corresponding to an approved trading algorithm. In some examples, a government auditor reviews and approves a trading algorithm definition, and then facilitates the generation of a unique identifier (for example, using a computer program on a computing device).

A unique identifier may be generated by any suitable software, hardware, or software- and hardware-based configuration. For example, a unique identifier may be generated by the example trading algorithm design application 116 (for example, ADL), an authorization application, a trading tool, or any other suitable software- and/or hardware-based configuration.

A unique identifier may change at one or more times and/or in response to one or more events. For example, a unique identifier associated with a trading algorithm definition may change each time the trading algorithm definition is saved, changed, uploaded, modified, approved, etc. Changing a unique identifier can, for example, prevent a trader from making changes to a trading algorithm after the trading algorithm has been approved by a risk manager.

In some examples, unique identifiers do not change in response to changing parameters. As mentioned above, a parameter may include, for example, an input into the logic expressions of the trading algorithm. For example, a trading algorithm may include a conditional statement that indicates "buy 10 contracts when market reaches 94.5." The "10" may be a trading algorithm parameter. The unique identifier may not change if the "10" is changed and the logic of the trading algorithm remains the same.

In some examples, a unique identifier may change when one, some, or all of the parameters are changed, but the change may be such that all or some of the unique identifier is still matched with a previously generated unique identifier. For example, a trading algorithm, as originally created, may be associated with a unique identifier of "98765." As discussed in more detail below, the unique identifier may be authorized and saved to a server device. Prior to launching the trading algorithm but after the trading algorithm is authorized, one or more trading algorithm parameters are changed but the logic of the trading algorithm remains the same. In this example, saving the trading algorithm and new parameters causes the unique identifier to change to "98765-V." In this example, when the server device compares the new unique identifier to the unique identifier saved on the server device, it may allow for the difference in the unique identifiers. In this example, the first five characters of the unique identifier match. Accordingly, the server device may execute the trading algorithm.

Allowing trading algorithm parameters to change without causing the unique identifier, which is associated with that trading algorithm, to change may provide flexibility to a trader. For example, the trading algorithm may include a conditional statement that indicates "buy 10 contracts when market reaches 94.5." The user may change the "10" to "5" or "15" without causing the unique identifier to change. This allows the trader the ability to change the number of contracts that are bought without having to have the trading algorithm authorized again.

Limits may be placed on which parameters may be changed and/or how much the parameters may change from the already authorized parameters. The range of how much a parameter may change or which parameters may change may be set, for example, by a risk manager. For example, the number of contracts to be traded may change within a defined range or tolerance (e.g., +/−10). The trader may change the number of contracts within this tolerance. Outside of this tolerance, the trader may be unable to change the trading algorithm variables.

The foregoing and following discussions of the unique identifier refer to a single identifier in or based on a single file. However, it should be understood that the unique identifier may be a collection of or based on multiple files and/or multiple unique identifiers.

IV. Example Authorization Techniques

FIGS. 2 and 3A-3H are flow diagrams representative of example machine readable instructions that may be executed to implement, but is not limited to implementing, the example system shown in FIG. 1 and/or portions of one or more of that system. The example process(es) of FIGS. 2 and 3A-3H may be performed using a processor, a controller and/or any suitable computing device. For example, the example process(es) of FIGS. 2 and 3A-3H may be implemented using coded instructions (for example, computer readable instructions) stored on a tangible computer readable medium, such as a flash memory, a read-only memory (ROM), and/or a random-access memory (RAM). In various embodiments, such a tangible computer readable medium is non-transitory.

Some or all of the example process(es) of FIGS. 2 and 3A-3H may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example process(es) of FIGS. 2 and 3A-3H may be implemented as any combination(s) of any of the foregoing techniques, for example, any combination of firmware, software, discrete logic and/or hardware. Further, although the example process(es) of FIGS. 2 and 3A-3H is disclosed with reference to the flow diagram of FIGS. 2 and 3A-3H, other methods of implementing the process(es) of FIGS. 2 and 3A-3H may be employed. For example, the order of execution of the blocks may be changed, and/or some of the blocks disclosed may be changed, eliminated, sub-divided, or combined. Additionally, any or all of the example process(es) of FIGS. 2 and 3A-3H may be performed sequentially and/or in parallel by, for example, separate processing threads, processors, devices, discrete logic, circuits, etc.

Figure 2:
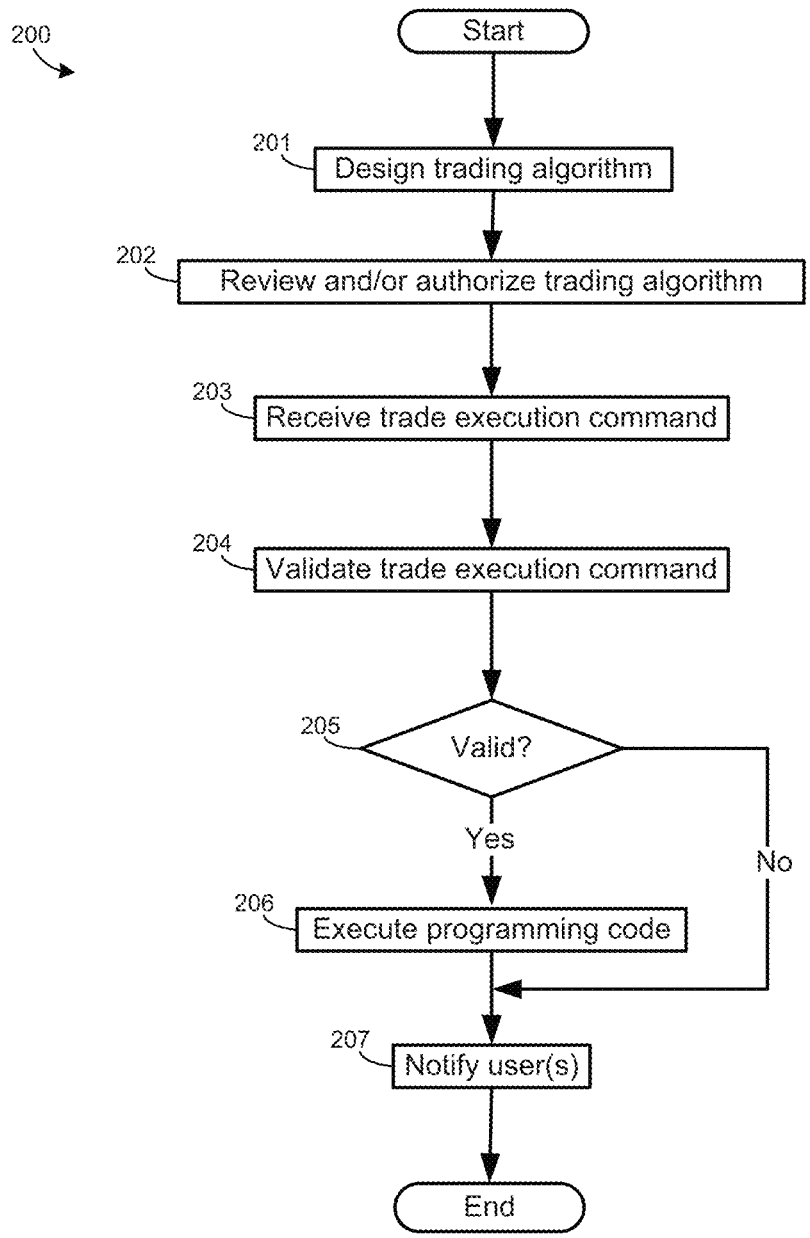
FIG. 2 illustrates a flow diagram depicting an example method for authorizing a trading algorithm.

FIG. 2 is a flow diagram illustrating an example method for authorizing a trading algorithm. At block 201, a trading algorithm is designed. As disclosed above with respect to FIG. 1, a user of the client device 112 may, for example, use the trading algorithm design application 116 to design a trading algorithm and/or a trading algorithm definition corresponding to the trading algorithm.

At block 202, the trading algorithm is authorized on a remote algorithm server (for example, the server device 122 shown in FIG. 1) operable to execute programming code representing the trading algorithm. The algorithm server may be remote or directly connected to the risk manager device 114. In some examples, the authorization may include receiving a user input (for example, through a graphical user interface of a program running on the risk manager device 114).

As disclosed above with respect to FIG. 1, a risk manager may evaluate and/or authorize the trading algorithm definition using the risk manager device 114. The risk manager device 114 may be a remote device relative to the client device 112. In some examples, the risk manager may evaluate the trading algorithm definition to determine the likely or actual risk of the trading algorithm. For example, a risk manager may evaluate the conditional statement "buy 10 contracts when market reaches 94.5" in a trading algorithm definition to determine if the conditional statement exceeds an acceptable risk level. In some examples, the risk manager may evaluate the trading algorithm definition to evaluate the logic of the trading algorithm. For example, a risk manager may evaluate the conditional statement "buy 10 contracts when market reaches 94.5" to determine if the conditional statement will function properly by itself, with another conditional statement, in the desired exchange or desired market, or any combination thereof. In some examples, the risk manager may review the tradeable objects in a spread, for example, to determine whether price movements of the tradeable objects are related. In some examples, the risk manager may review the trading algorithm definition to evaluate the logic and the risk level of the trading algorithm. In some examples, criterion for determining logic and risk level of a trading algorithm definition may be stored to the risk manager device 114, for example, to assist the risk manager in reviewing the trading algorithm definition. In some examples, the risk manager may review the trading algorithm, trading algorithm definition, or both on the client device 112 and/or another device.

The risk manager may facilitate the sending of an authorization to the server device 122 using the risk manager device 114. In some examples, the authorization is sent directly to the server device 122. For example, the risk manager may use an authentication interface of the risk manager device 114 to send a unique identifier of a trading algorithm definition directly to the server device 122. The unique identifier may be associated with the programming code representing the trading algorithm, one or more traders authorized to execute the programming code, a version of the trading algorithm, or any combination thereof. In some examples, the authorization is sent to the server device 122 by way of one or more other devices. For example, the risk manager may use an authentication interface of the risk manager device 114 to send a certificate of authentication for a trading algorithm definition to the client device, which may in turn send the certificate to the server device 122. In some examples, the risk manager may use an authentication interface of the risk manager device 114 to send the trading algorithm definition to a third-party device (for example, a computing device of a government official authorized to evaluate trading algorithms) for further authentication.

At block 203, a trade execution command is received by the server device 122. The trade execution command includes one or more identifiers for use in authentication. For example, the trade execution command may include programming code, a unique identifier, a trader identifier, a certificate, or any combination thereof.

At block 204 and decision block 205, the trade execution command is validated. A decision is made whether the one or more identifiers in the trade execution command are valid (decision block 205). If the one or more identifiers in the trade execution command are valid, then the programming code is executed (block 206) and the user is notified that the programming code was executed (block 207). If, however, the one or more identifiers in the trade execution command are not valid, then the method bypasses the execution of the programming code and notifies the user(s) that the programming code was not executed (block 207).

For example, a user (for example, a trader) may use the client device 112 to send a trade execution command, including a trading algorithm and a unique identifier, to the server device 122. Upon receipt, the server device 122 may compare the unique identifier to a unique identifier that was approved (for example, by a risk manager) and stored to the server device 122. If the unique identifiers at least substantially match, then the server device 122 would execute programming code corresponding to the trading algorithm and notify the user as such (for example, by sending an e-mail). Otherwise, the server device 122 would not execute the programming code and would notify the user that the programming code was not executed.

FIGS. 3A-3H are flow diagrams illustrating example methods for authorizing a trading algorithm. In FIGS. 3A-3H, the exchange 126, server device 122, client device 112, and risk manager 114 are illustrated as vertical lines. For clarity and ease of description, the gateway 124 is not shown. However, it should be understood that the gateway may operate in conjunction with the exchange 126, server device 122, client device 112, and risk manager 114.

In the illustrated examples, each of the exchange 126, server device 122, client device 112, and risk manager 114 may execute one or more processes. In FIGS. 3A-3H, processes are shown as blocks aligned along the respective device that executes the respective processes in that particular example. An arrow depicts information conveyed from one device to another device. For example, in FIG. 3A, arrow 316a represents the sending of at least a trading algorithm and a unique identifier from the client device 112 to the risk manager device 114. Logical processes are also depicted by arrows. For example, in FIG. 3A, the "yes" arrow arising from decision block 338a represents the server device 122 transitioning from decision block 338a to block 340a. The order of the disclosed information flow and/or logical processes may be changed, and/or some of the disclosed information flow and/or logical processes may be changed, eliminated, sub-divided, or combined.

A. Example 1

Figure 3A:
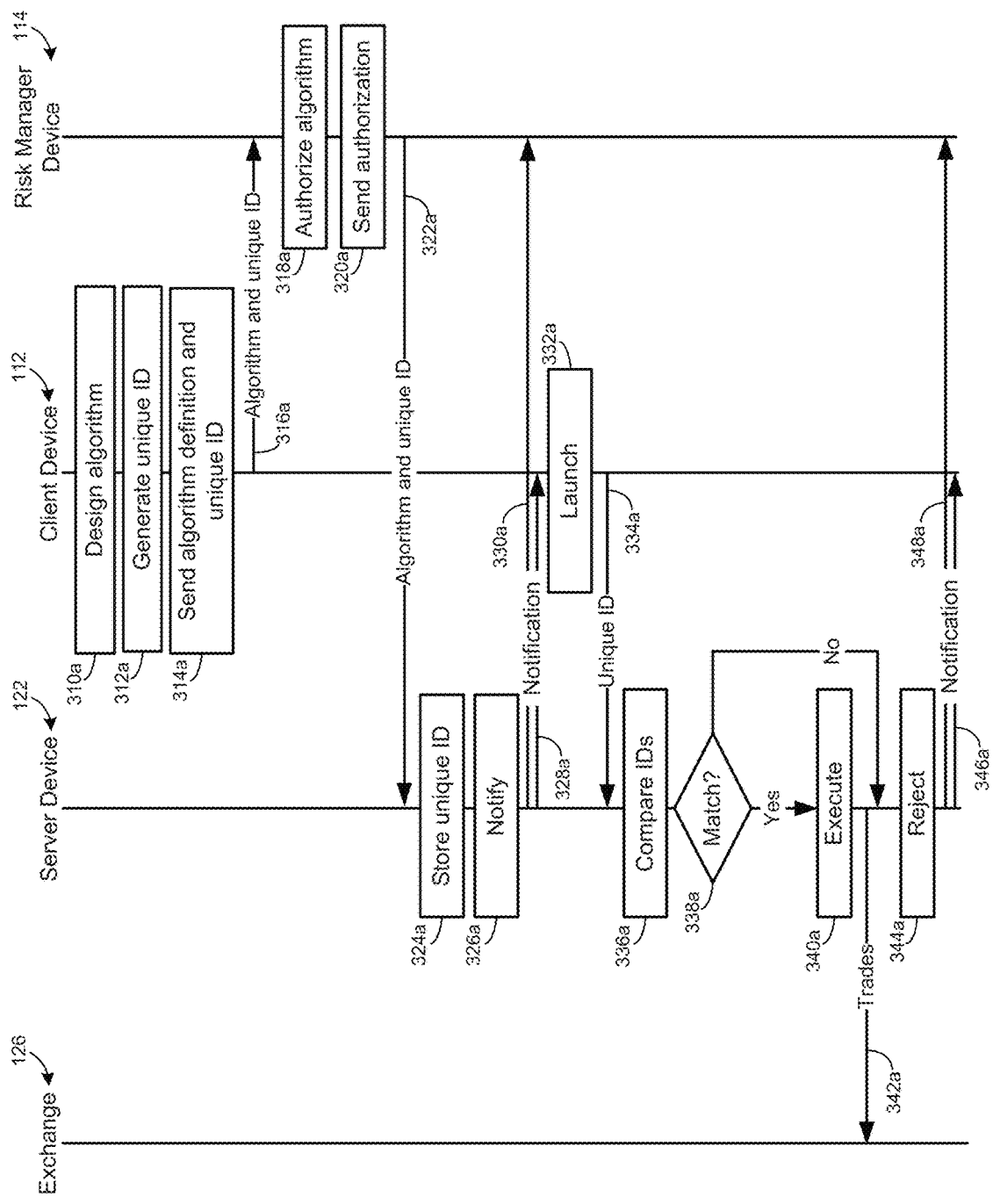
FIGS. 3A-3J illustrate flow diagrams depicting example methods for authorizing a trading algorithm.

With reference to FIG. 3A, at block 310a, a trading algorithm is designed on the client device 112. As disclosed above, the client device 112 may include a trading algorithm design tool, such as ADL, that enables a user to design the trading algorithm and/or the trading algorithm definition.

At block 312a, a unique identifier is generated on the client device 112. As disclosed above, the unique identifier corresponds to one or more of the trading algorithm and the trading algorithm definition. In the illustrated example, the unique identifier is generated in response to one or more events (for example, saving or modifying the trading algorithm definition).

At block 314a, the client device 112 sends at least the unique identifier and the trading algorithm definition to the risk manager device 114 (arrow 316a). In some examples, the client device 112 also sends the trading algorithm to the risk manager device 114.

At block 318a, the trading algorithm definition is authorized at the risk manager device 114. As disclosed above, the trading algorithm definition may be authorized by software running on the risk manager device 114 alone or by a combination of such software and user input from a risk manager. For example, as part of block 318a, the risk manager device 114 may present the trading algorithm definition to the risk manager, in graphical form or otherwise, to enable the risk manager to analyze the trading algorithm definition. Additionally or alternatively, the risk manager device 114 may conduct an analysis of the trading algorithm definition and then present that analysis to the risk manager.

At block 320a, the risk manager device 114 conveys an authorization to the server device 122 (arrow 322a). In the illustrated example, the authorization includes the unique identifier and either the trading algorithm or programming code representing the trading algorithm. If, at block 314*a*, the client device 112 sent the trading algorithm to the risk manager device 114, then the risk manager device 114 may send that trading algorithm or programming code representing that trading algorithm to the server device 122. However, if, at block 314*a*, the client device 112 did not send the trading algorithm to the risk manager device 114, then the risk manager device 114 may derive the trading algorithm from the trading algorithm definition received from the client device 112 (for example, using ADL), and then send the trading algorithm or programming code representing the trading algorithm to the server device 122.

At block 324*a* of the illustrated example, the server device 122 stores the received unique identifier and the trading algorithm or programming code representing the trading algorithm. In this example, the server device 122 is configured to execute any programming code corresponding to any subsequently received trading algorithm having a unique identifier at least substantially matching the stored unique identifier.

At block 326*a* of the illustrated example, the server device 122 notifies the user of the client device 112 and/or the risk manager device 114 that the server device 122 has received and stored the unique identifier and trading algorithm (arrow 328*a*). Also at block 326*a* of the illustrated example, the server device 122 notifies the user of the client device 112 and/or the risk manager device 114 that the server device 122 is ready to execute programming code corresponding to the trading algorithm (arrow 330*a*).

At block 332*a*, the user of the client device 112 may launch the trading algorithm. Launching the trading algorithm may include sending information related to a trading algorithm to a server device for execution or executing the trading algorithm. When launching the trading algorithm, the client device 112 sends at least the unique identifier to the server device 122 (arrow 334*a*). In some examples, the client device 112 additionally sends the trading algorithm to the server device 122. For example, the unique identifier associated with the trading algorithm may be embedded in the file containing the trading algorithm, and the client device 112 may send that file to the server device 122.

At block 336*a*, the server device 122 compares the unique identifier received from the client device 112 (at block 332*a*) to the unique identifier stored by the server device 122 (at block 324*a*). At block 338*a*, the server device 122 compares the unique identifiers to determine whether the unique identifiers at least substantially match. In some examples, the server device 122 may determine whether the unique identifiers exactly match (for example, whether the unique identifiers are bit-for-bit identical). In some examples, the server device 122 may determine whether the unique identifiers substantially match (for example, whether a portion of one unique identifier matches a portion of the other unique identifier). If the unique identifiers at least substantially match, then at block 340*a*, the server device 122 executes programming code corresponding to the trading algorithm. Arrow 342*a* represents information (for example, trades) being exchanged between the server device 122 and the exchange 126. If, however, the unique identifiers do not at least substantially match, then at block 344*a*, the server device 122 does not execute the programming code corresponding to the trading algorithm. Additionally, the server device 122 notifies one or more of the user of the client device 112 (arrow 346*a*) and the risk manager (arrow 348*a*) that the server device 122 has not executed the programming code.

B. Example 2

Figure 3B:
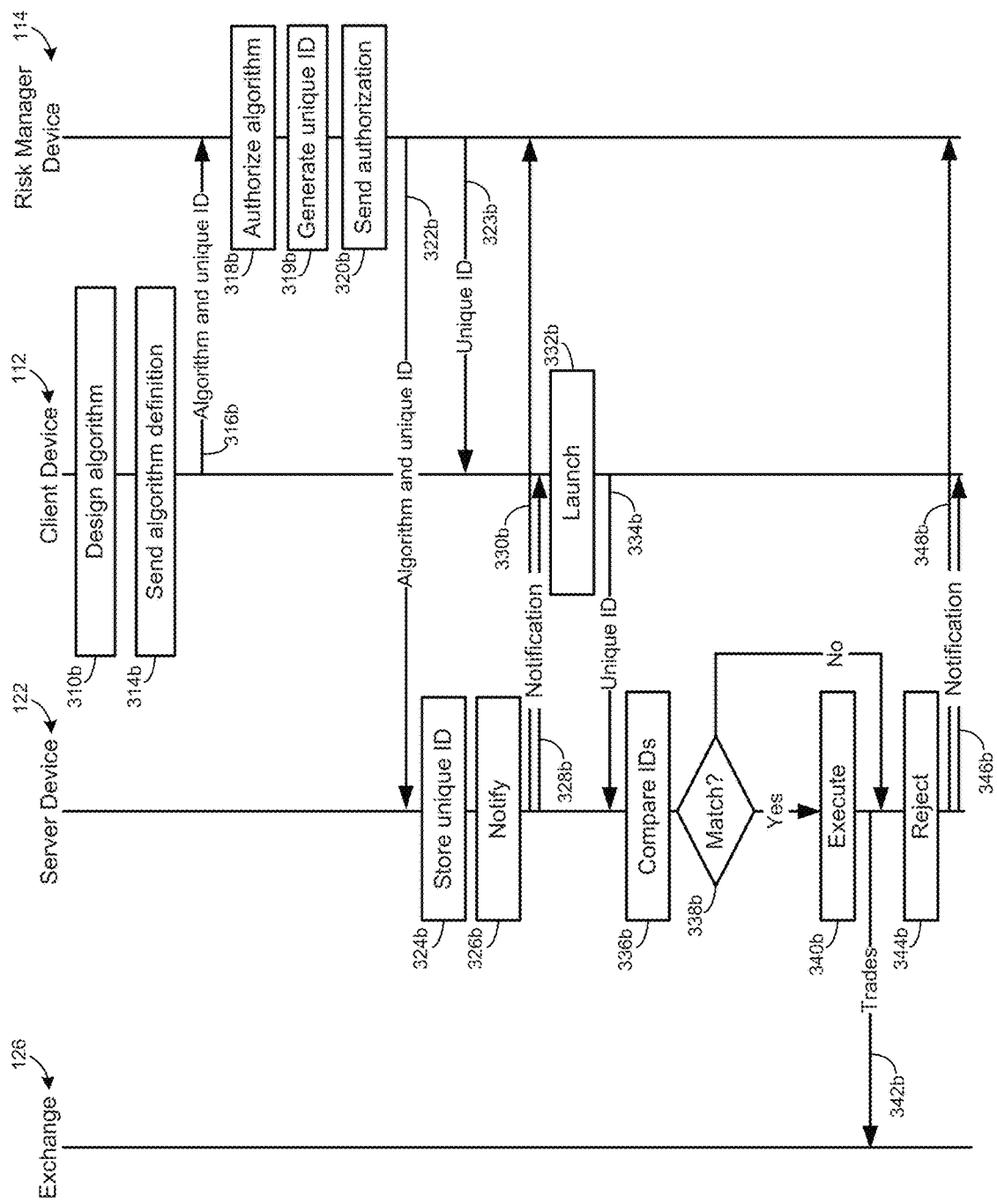

FIG. 3B shows an example method for authorizing a trading algorithm. In FIG. 3B, the unique identifier is generated by the risk manager 114 device, rather than by the client device 112.

At block 310*b* of FIG. 3B, a trading algorithm is designed on the client device 112. At block 314*b*, the client device 112 sends at least the trading algorithm definition to the risk manager device 114 (arrow 316*b*). In some examples, the client device 112 additionally sends the trading algorithm to the risk manager device 114. At block 318*b*, the trading algorithm definition is authorized at the risk manager device 114, in a similar manner as disclosed above in connection with FIG. 3A.

At block 319*b*, a unique identifier is generated on the risk manager device 112. The unique identifier may be generated, for example, after the risk manager reviews and/or approves the trading algorithm definition. The risk manager may generate the unique identifier, for example, by inputting a combination of letters and numbers into a user interface of the risk manager device 112, which may, in turn, store the unique identifier. In some examples, the risk manager may facilitate the generation of a unique identifier using the risk manager device 114, which may, in turn, generate and store a unique identifier having a pseudorandom combination of letters and numbers.

At block 320*b*, an authorization is sent from the risk manager device 114 to the server device 122 (arrow 322*b*). As disclosed above, the authorization includes the unique identifier and either the trading algorithm or programming code representing the trading algorithm. In the illustrated example of FIG. 3B, the risk manager also sends the unique identifier from the risk manager device 114 to the client device 112 to enable the user of the trading algorithm (for example, the trader) to facilitate the execution of the trading algorithm on the server device 122 (arrow 323*b*).

At block 324*b* of the illustrated example, the server device 122 stores the received unique identifier and the trading algorithm or programming code representing the trading algorithm. In this example, the server device 122 is configured to execute any programming code corresponding to any subsequently received trading algorithm having a unique identifier at least substantially matching the stored unique identifier.

At block 326*b* of the illustrated example, the server device 122 notifies the user of the client device 112 and/or the risk manager device 114 that the server device 122 has received and stored the unique identifier and trading algorithm (arrow 328*b*). Also at block 326*b* of the illustrated example, the server device 122 notifies the user of the client device 112 and/or the risk manager device 114 that the server device 122 is ready to execute programming code corresponding to the trading algorithm (arrow 330*b*).

At block 332*b*, the user of the client device 112 may launch the trading algorithm. Launching the trading algorithm may include sending information related to a trading algorithm to a server device for execution or executing the trading algorithm. When launching the trading algorithm, the client device 112 sends at least the unique identifier to the server device 122 (arrow 334*b*). In some examples, the client device 112 additionally sends the trading algorithm to the server device 122. For example, the unique identifier associated with the trading algorithm may be embedded in the file containing the trading algorithm, and the client device 112 may send that file to the server device 122.

At block 336b, the server device 122 compares the unique identifier received from the client device 112 (at block 332b) to the unique identifier stored by the server device 122 (at block 324b). At block 338b, the server device 122 compares the unique identifiers to determine whether the unique identifiers at least substantially match. If the unique identifiers at least substantially match, then at block 340b, the server device 122 executes programming code corresponding to the trading algorithm. Arrow 342b represents information (for example, trades) being exchanged between the server device 122 and the exchange 126. If, however, the unique identifiers do not at least substantially match, then at block 344b, the server device 122 does not execute the programming code corresponding to the trading algorithm. Additionally, the server device 122 notifies one or more of the user of the client device 112 (arrow 346b) and the risk manager (arrow 348b) that the server device 122 has not executed the programming code.

C. Example 3

Figure 3C:
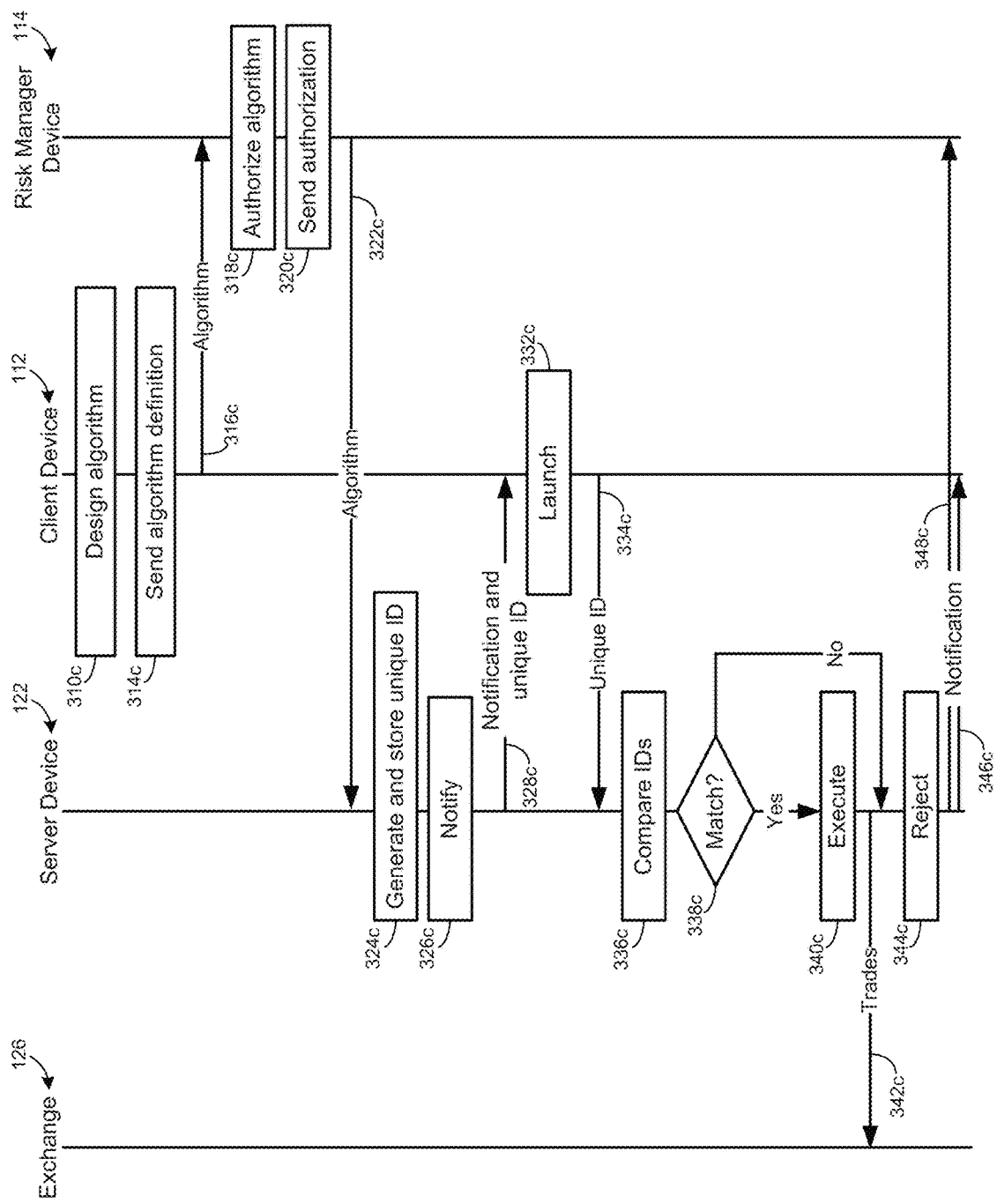

FIG. 3C shows an example method for authorizing a trading algorithm. In the example method shown in FIG. 3C, the unique identifier is generated by the server device 122, rather than by the client device 112 or the risk manager device 114.

At block 310c of FIG. 3C, a trading algorithm is designed on the client device 112. At block 314c, the client device 112 sends at least the trading algorithm definition to the risk manager device 114 (arrow 316c). In some examples, the client device 112 additionally, sends the trading algorithm to the risk manager device 114. At block 318c, the trading algorithm definition is authorized at the risk manager device 114.

At block 320c, an authorization is sent from the risk manager device 114 to the server device 122 (arrow 322c). In the illustrated example, the authorization includes at least the trading algorithm and/or programming code representing the trading algorithm.

At block 324c, a unique identifier is generated on the server device 122 and stored to the server device 122. The server device 122 may generate the unique identifier, for example, by determining a hash value of the trading algorithm and/or programming code corresponding to the trading algorithm, and the hash value may be stored to the server device 122 as the unique identifier. The server device 122 may generate and store a unique identifier in additional or alternative manners.

At block 326c, the server device 122 sends a notification to the user (for example, a trader) of the client device 112 (for example, by sending an e-mail), as represented by arrow 328c. The notification includes at least the unique identifier generated by the server device 122. The unique identifier enables the user to facilitate the execution of the trading algorithm.

At block 332c, the user of the client device 112 uses the client device 112 to launch the trading algorithm. Launching the trading algorithm may include sending information related to a trading algorithm to a server device or executing the trading algorithm. When launching the trading algorithm, the client device 112 sends at least the unique identifier to the server device 122 (arrow 334c). In some examples, the client device 112 additionally sends the trading algorithm to the server device 122. For example, the unique identifier associated with the trading algorithm may be embedded in the file containing the trading algorithm, and the client device 112 may send that file to the server device 122.

At block 336c, the server device 122 compares the unique identifier received from the client device 112 (at block 332c) to the unique identifier stored by the server device 122 (at block 324c). At block 338c, the server device 122 compares the unique identifiers to determine whether the unique identifiers at least substantially match. If the unique identifiers at least substantially match, then at block 340c, the server device 122 executes programming code corresponding to the trading algorithm. Arrow 342c represents information (for example, trades) being exchanged between the server device 122 and the exchange 126. If, however, the unique identifiers do not at least substantially match, then at block 344c, the server device 122 does not execute the programming code corresponding to the trading algorithm. Additionally, the server device 122 notifies one or more of the user of the client device 112 (arrow 346c) and the risk manager (arrow 348c) that the server device 122 has not executed the programming code.

D. Example 4

Figure 3D:
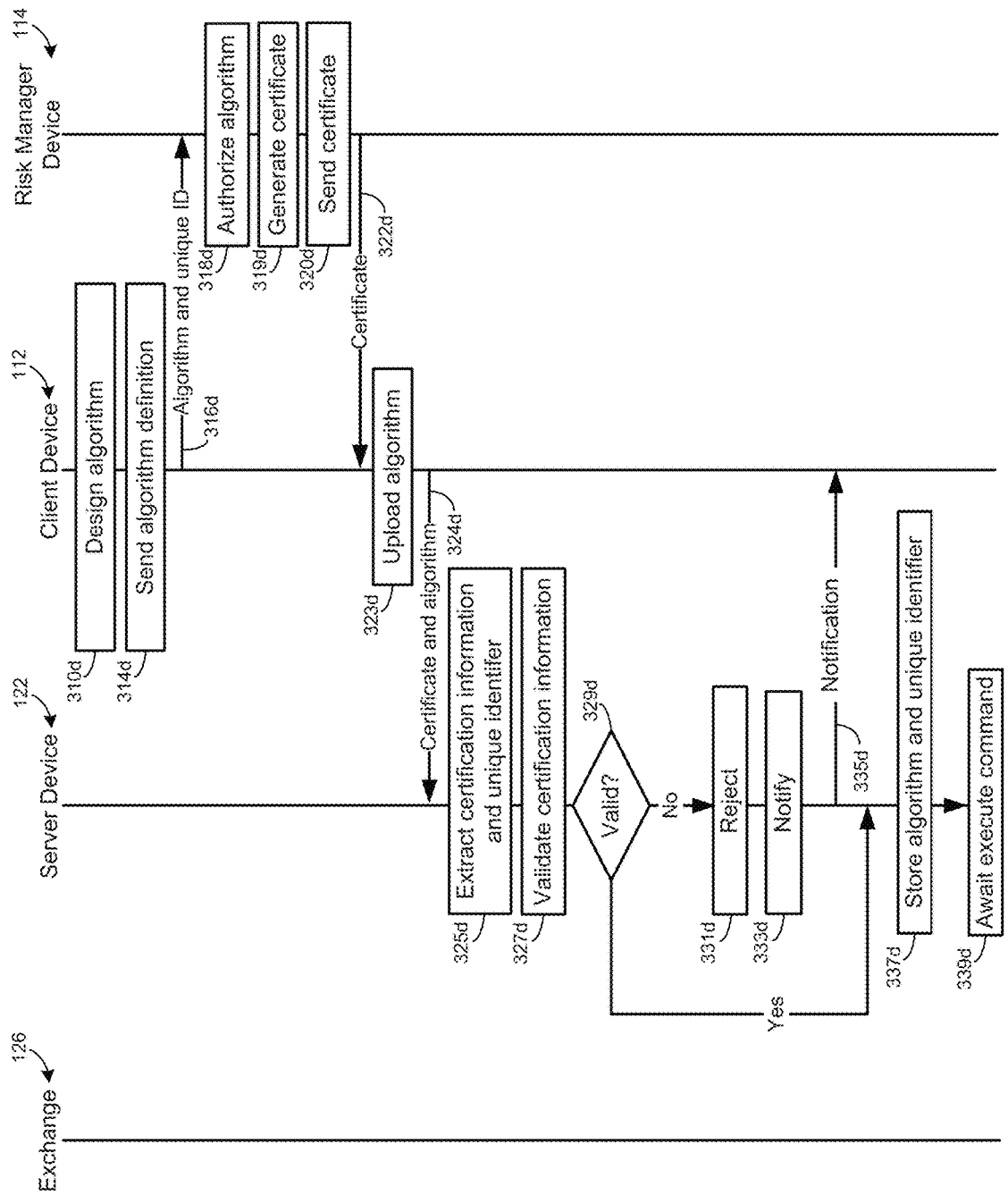

FIG. 3D shows an example method for authorizing a trading algorithm. The method shown in FIG. 3D involves the use of a certificate. In the illustrated example, the certificate cannot be modified by a user other than the risk manager and contains information sufficient to indicate that the risk manager has approved the trading algorithm associated with the certificate. As such, the certificate may be sent to the server device 122 by the risk manager or another user (for example, the trader authorized to execute the trading algorithm).

At block 310d, a trading algorithm is designed on the client device 112. At block 314d, the client device 112 sends at least the trading algorithm definition to the risk manager device 114. Arrow 316d represents the sending of at least the trading algorithm definition from the client device 112 to the risk manager 114. The client device 112 may also, but need not, send the trading algorithm and/or the unique identifier of the trading algorithm and/or trading algorithm definition to the risk manager device 114. At block 318d, the trading algorithm definition is authorized at the risk manager device 114.

At block 319d, a certificate is generated at the risk manager device 114. In the illustrated example, the certificate includes at least certification information and a unique identifier. Certification information refers to information indicating that the risk manager has certified the trading algorithm. For example, the certification information may be a hash value of a unique risk manager identifier, which identifies the risk manager reviewing and/or authorizing the trading algorithm definition. The hash value of the unique risk manager identifier may be stored to the server device 122. This storage location may enable a user other than the risk manager to see the hash value of the unique risk manager identifier, but not the unique risk manager identifier itself. Also, the server device 122 may validate the hash value by comparing it with the hash value stored to the server device 122. The certification information may be take additional or alternative forms.

At block 320d, the risk manager device 114 sends the certificate to the client device 112 (arrow 222). At block 323d, the client device 112 uploads at least the trading algorithm and/or programming code associated with the trading algorithm, along with the certificate, to the server device 122 (arrow 324d). At block 325d, the server device 122 extracts the certification information and unique identifier from the certificate and stores the certification information and unique identifier. At block 327d, the server device 122 validates the certification information to ensure that the certification information corresponds to a certifier. For example, the server device 122 may compare the received certification information to certification information stored at the server device 122, and on that basis, determine whether the extracted certification information corresponds to a certifier.

At decision block 329d, the server device 122 determines whether the certification information corresponds to a legitimate certifier. If the certification does not correspond to a legitimate certifier, then the server device 122 rejects the trading algorithm and the unique identifier (block 331d) and notifies the client device 112 of such a rejection (block 333d and arrow 335d). If, however, the certification information corresponds to a legitimate certifier, then at block 337d, the server device 122 stores the trading algorithm and the corresponding unique identifier. At block 339d, the server device 122 awaits an execute command having a unique identifier. Although not shown in FIG. 3D, the server device 122 is configured to compare the unique identifier in any received execute command to the unique identifier stored to the server device 122 at block 324d. At least in part on the basis of that comparison, the server device 122 is to execute or reject programming code corresponding to the trading algorithm.

E. Example 5

Figure 3E:
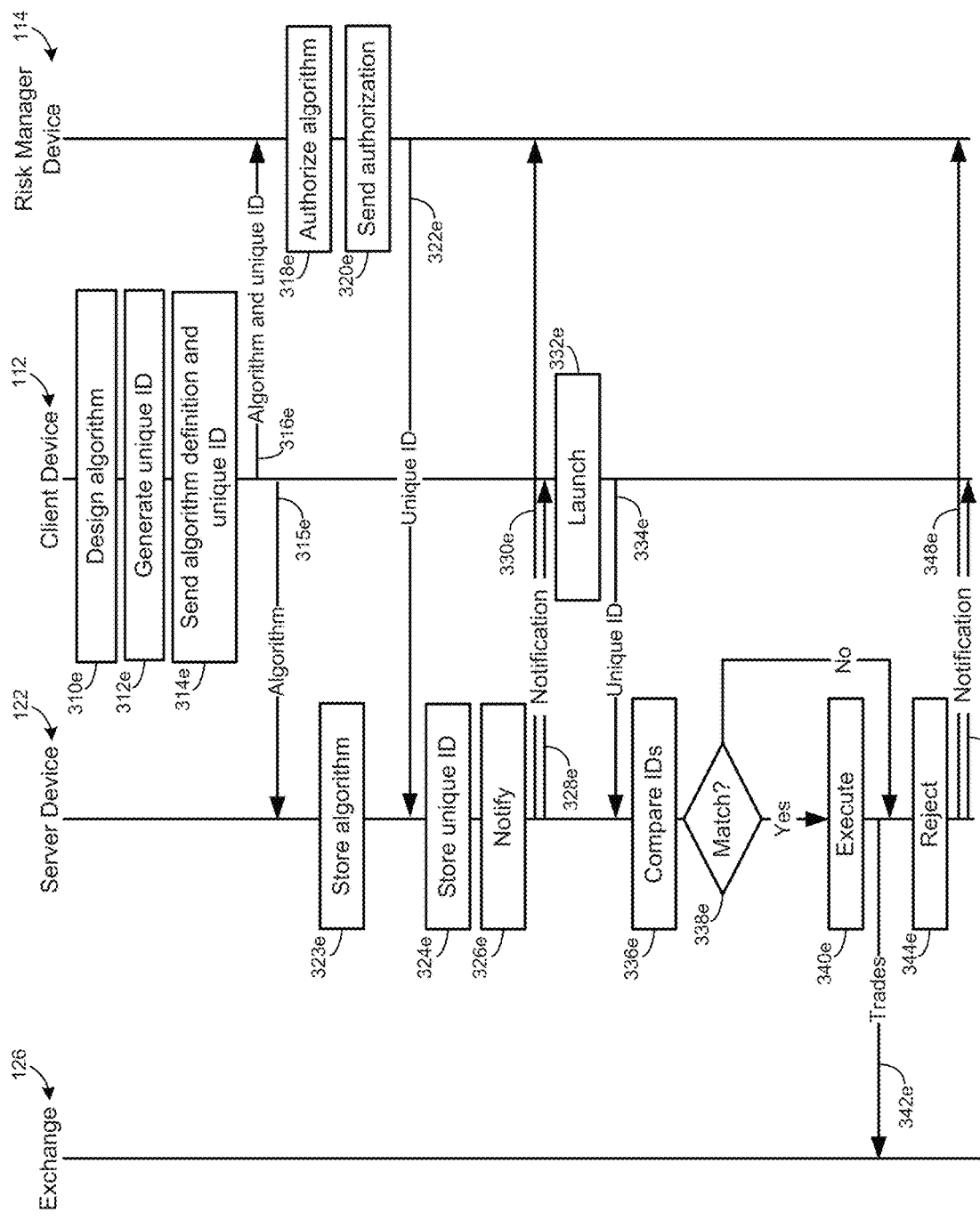

FIG. 3E shows an example method for authorizing a trading algorithm. In the example method disclosed in FIG. 3E, the client device 112 sends the trading algorithm and/or programming code corresponding to the trading algorithm to the server device 122 (block 315e). Therefore, at block 320e of FIG. 3E, because the server device 122 already has the trading algorithm and/or programming code corresponding to the trading algorithm, the risk manager device 114 need only send the unique identifier. Arrow 322e represents the sending of at least the unique identifier from the risk manager device 114 to the server device 122.

At block 324e of the illustrated example, the server device 122 stores the received unique identifier. At block 326e, the server device 122 notifies the user of the client device 112 and/or the risk manager device 114 that the server device 122 has received and stored the unique identifier and trading algorithm (arrows 328e and 330e).

At block 332e, the user of the client device 112 launches the trading algorithm. Launching the trading algorithm may include sending information related to a trading algorithm to a server device or executing the trading algorithm. When launching the trading algorithm, the client device 112 sends at least the unique identifier to the server device 122 (arrow 334e). At block 336e, the server device 122 compares the unique identifier received from the client device 112 (at block 332e) to the unique identifier stored by the server device 122 (at block 324e). At block 338e, the server device 122 compares the unique identifiers to determine whether the unique identifiers at least substantially match. If the unique identifiers at least substantially match, then at block 340e, the server device 122 executes programming code corresponding to the trading algorithm. Arrow 342e represents information (for example, trades) being exchanged between the server device 122 and the exchange 126. If, however, the unique identifiers do not at least substantially match, then at block 344e, the server device 122 does not execute the programming code corresponding to the trading algorithm. Additionally, the server device 122 notifies one or more of the user of the client device 112 (arrow 346e) and the risk manager (arrow 348e) that the server device 122 has not executed the programming code.

F. Example 6

Figure 3F:
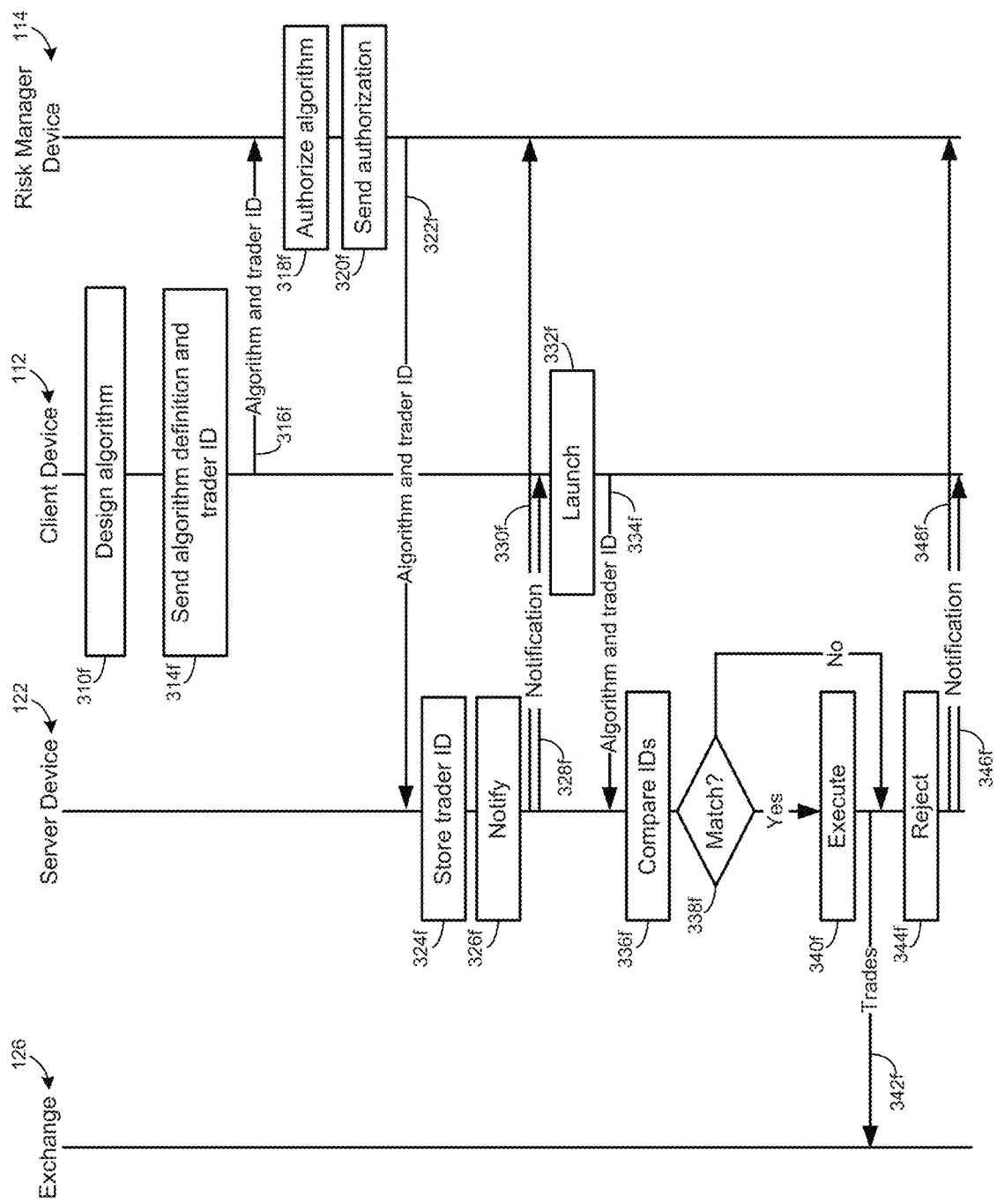

FIG. 3F shows an example method for authorizing a trading algorithm. The method of FIG. 3F involves the use of a trader identifier. The trader identifier may be a form of a unique identifier. The trader identifier may identify, for example, a particular user (for example, a trader), software used by the particular user, a work station operated by the particular user, an experience level associated with the user, a trading department associated with the user, or a combination of these. The trader identifier may be known to the user of the client device 112. In some examples, the trader identifier is stored to the client device 112 and appears on a user interface generated by the client device 112.

After a trading algorithm is designed on the client device 112 (block 310f), the client device 112 sends at least the trader identifier and the trading algorithm definition to the risk manager device 114 (block 314f and arrow 316f). In some examples, the client device 112 additionally sends the trading algorithm to the risk manager device 114.

At block 318f, the trading algorithm definition is authorized at the risk manager device 114. At block 320f, an authorization is sent from the risk manager device 114 to the server device 122. The authorization includes the trader identifier, along with the trading algorithm or programming code representing the trading algorithm (arrow 322f).

At block 324f, the server device 122 stores the received trader identifier. In some examples, the server device 122 stores the trading algorithm or programming code representing the trading algorithm. At block 326f, the server device 122 notifies the user of the client device 112 and/or the risk manager device 114 that the server device 122 has received and stored the trader identifier and trading algorithm (arrows 328f and 330f).

At block 332f, the user of the client device 112 uses the client device 112 to launch the trading algorithm. Launching the trading algorithm may include sending information related to a trading algorithm to a server device or executing the trading algorithm. When launching the trading algorithm, the client device 112 sends at least the trading algorithm and the trader identifier to the server device 122 (arrow 334f). At block 336f, the server device 122 compares the trader identifier received from the client device 112 (at block 332f) to the trader identifier stored by the server device 122 (at block 324f). At block 338f, the server device 122 compares the trader identifiers to determine whether the trader identifiers at least substantially match. If the trader identifiers at last substantially match, then at block 340f, the server device 122 executes programming code corresponding to the trading algorithm. Arrow 342f represents information (for example, trades) being exchanged between the server device 122 and the exchange 126. If, however, the trader identifiers do not at least substantially match, then at block 344f, the server device 122 does not execute the programming code corresponding to the trading algorithm. Additionally, the server device 122 notifies one or more of the user of the client device 112 (arrow 346f) and the risk manager (arrow 348f) that the server device 122 has not executed the programming code.

A unique identifier may be used in conjunction with the trader identifier. For example, a unique identifier may be generated and sent to the user of the client device 112, as disclosed above with reference to FIGS. 3A and 3B. The user may then instruct the client device 112 to send the trading algorithm, trader identifier, and unique identifier to the server device 122. The server device 122 may then compare the unique identifier and the trader identifier stored to the server device 122, respectively, to the received unique identifier and trader identifier. The server device 122 may then execute programming code corresponding to the trading algorithm, if the trader identifiers at least substantially match and the unique identifiers at least substantially match.

G. Example 7

Figure 3G:
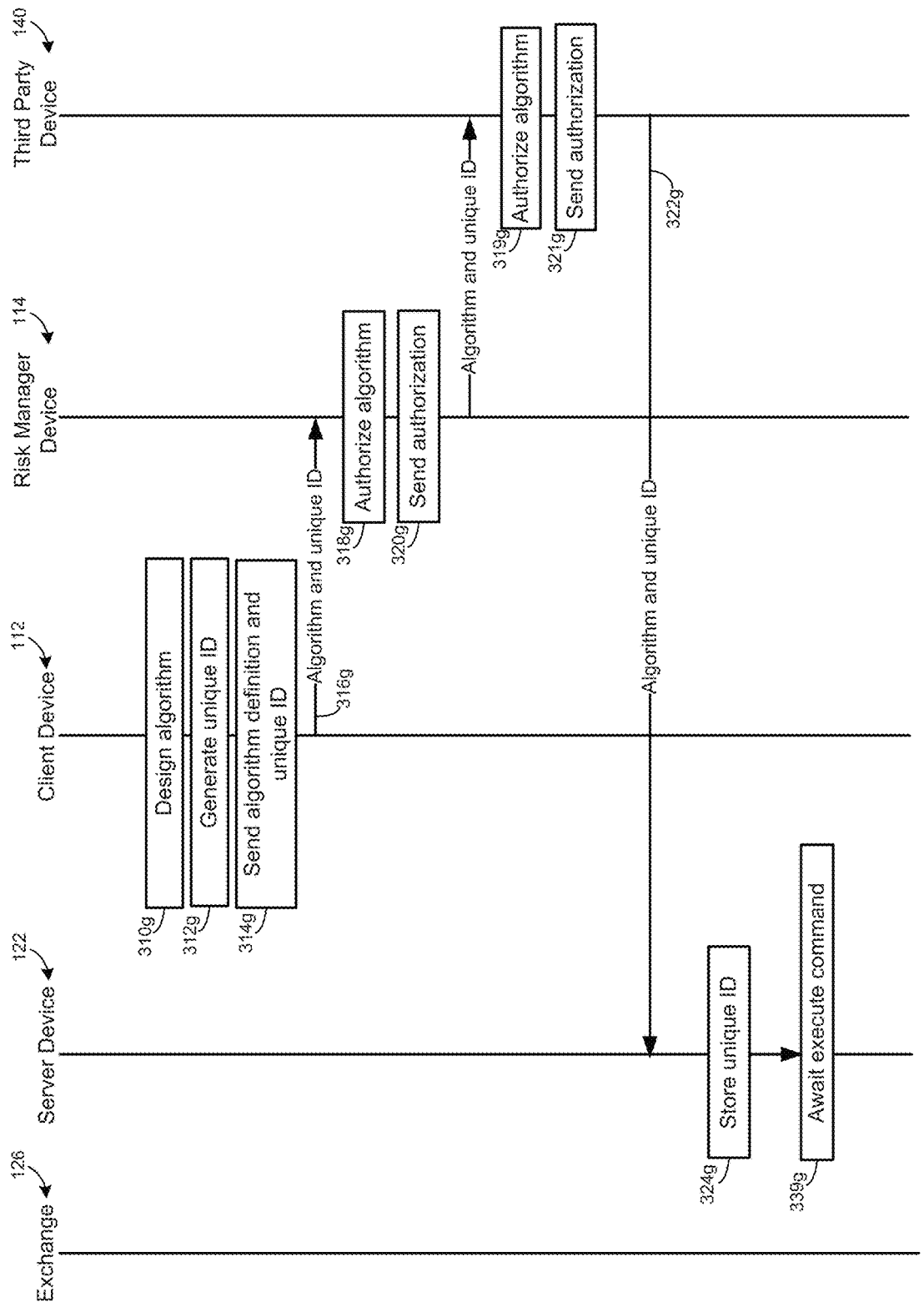

FIG. 3G shows an example method for authorizing a trading algorithm. The method disclosed in FIG. 3G includes a second authorizer and, therefore, a second level of authorization. As shown in FIG. 3G, the example method includes a third-party device 140, which may have a similar configuration to the risk manager device 114. The third-party device 140 may be, for example, a computing device of a government official who is to review and/or authorize trading algorithms. In some examples, the third-party device 140 is a computing device of a trading algorithm auditor who works outside the organization of the user authorized to facilitate the execution of the trading algorithm. In some examples, the trading algorithm auditor reviews the trading algorithm not only within a context of a particular trading group or portfolio, but within a broader or different context (for example, a trading market or a segment of a trading market). In some examples, the third-party device 140 is a computing device of a supervisor of the user authorized to facilitate the execution of the trading algorithm.

As shown in FIG. 3G, a trading algorithm is designed (block 310g), a unique identifier is generated (block 312g), and the trading algorithm definition and unique identifier are sent to the risk manager device 114 (block 314g and arrow 316g). Using the risk manager device 114, the trading algorithm is authorized (block 318g), and the trading algorithm and unique identifier are sent to the third-party device 140 (block 320g). Using the third-party device, the trading algorithm is then authorized (block 319g) and the trading algorithm and unique identifier are sent to the server device 122 (block 321g and arrow 322g). The unique identifier is then stored to the server device 122 (block 324g). At block 339g, the server device 122 awaits an execute command having a unique identifier. Although not shown in FIG. 3G, the server device 122 is configured to compare the unique identifier in any received execute command to the unique identifier stored to the server device 122 at block 324g. At least in part on the basis of that comparison, the server device 122 is to execute or reject programming code corresponding to the trading algorithm.

H. Example 8

Figure 3H:
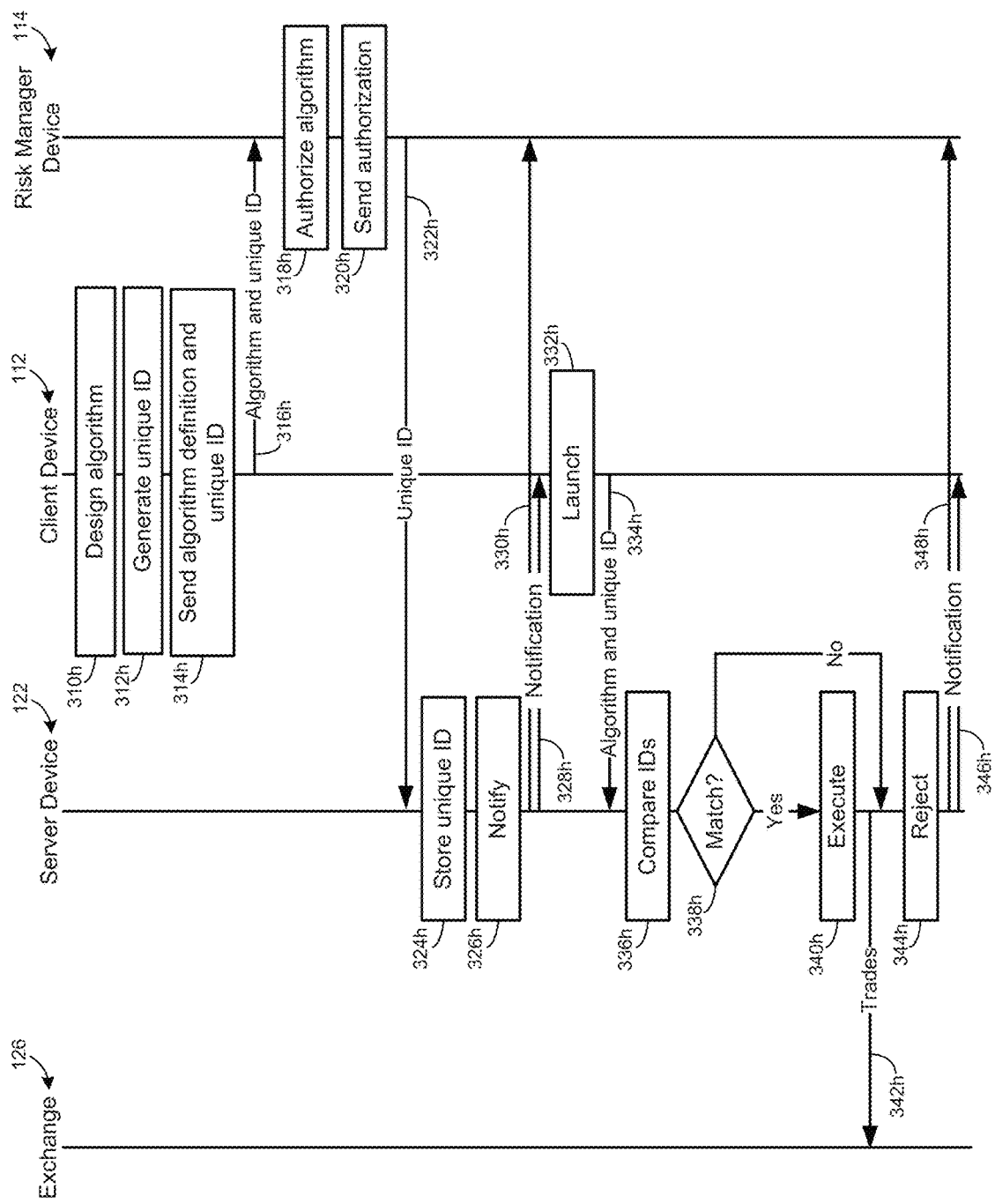

FIG. 3H shows an example method for authorizing a trading algorithm. In the example method disclosed in FIG. 3H, at the client device 112, the trading algorithm is designed (block 310h), the unique identifier is generated (block 312h), and the trading algorithm definition and unique identifier are sent to the risk manager device (block 314h and arrow 316h). At the risk manager device 114, the trading algorithm is authorized (block 318h) and an authorization is sent to the server device 122 (block 320h and arrow 322h).

At block 324h, the server device 122 stores the received unique identifier. At block 326h, the server device 122 notifies the user of the client device 112 and/or the risk manager device 114 that the server device 122 has received and stored the unique identifier and trading algorithm (arrows 328h and 330h).

At block 332h, the user of the client device 112 launches the trading algorithm. Launching the trading algorithm may include sending information related to a trading algorithm to a server device or executing the trading algorithm. When launching the trading algorithm, the client device 112 sends the unique identifier and the trading algorithm to the server device 122 (arrow 334h). At block 336h, the server device 122 compares the unique identifier received from the client device 112 (at block 332h) to the unique identifier stored by the server device 122 (at block 324h). At block 338h, the server device 122 compares the unique identifiers to determine whether the unique identifiers at least substantially match. If the unique identifiers at least substantially match, then at block 340h, the server device 122 executes programming code corresponding to the trading algorithm. Arrow 342h represents information (for example, trades) being exchanged between the server device 122 and the exchange 126. If, however, the unique identifiers do not at least substantially match, then at block 344h, the server device 122 does not execute the programming code corresponding to the trading algorithm. Additionally, the server device 122 notifies one or more of the user of the client device 112 (arrow 346h) and the risk manager (arrow 348h) that the server device 122 has not executed the programming code.

I. Example 9

Figure 3I:
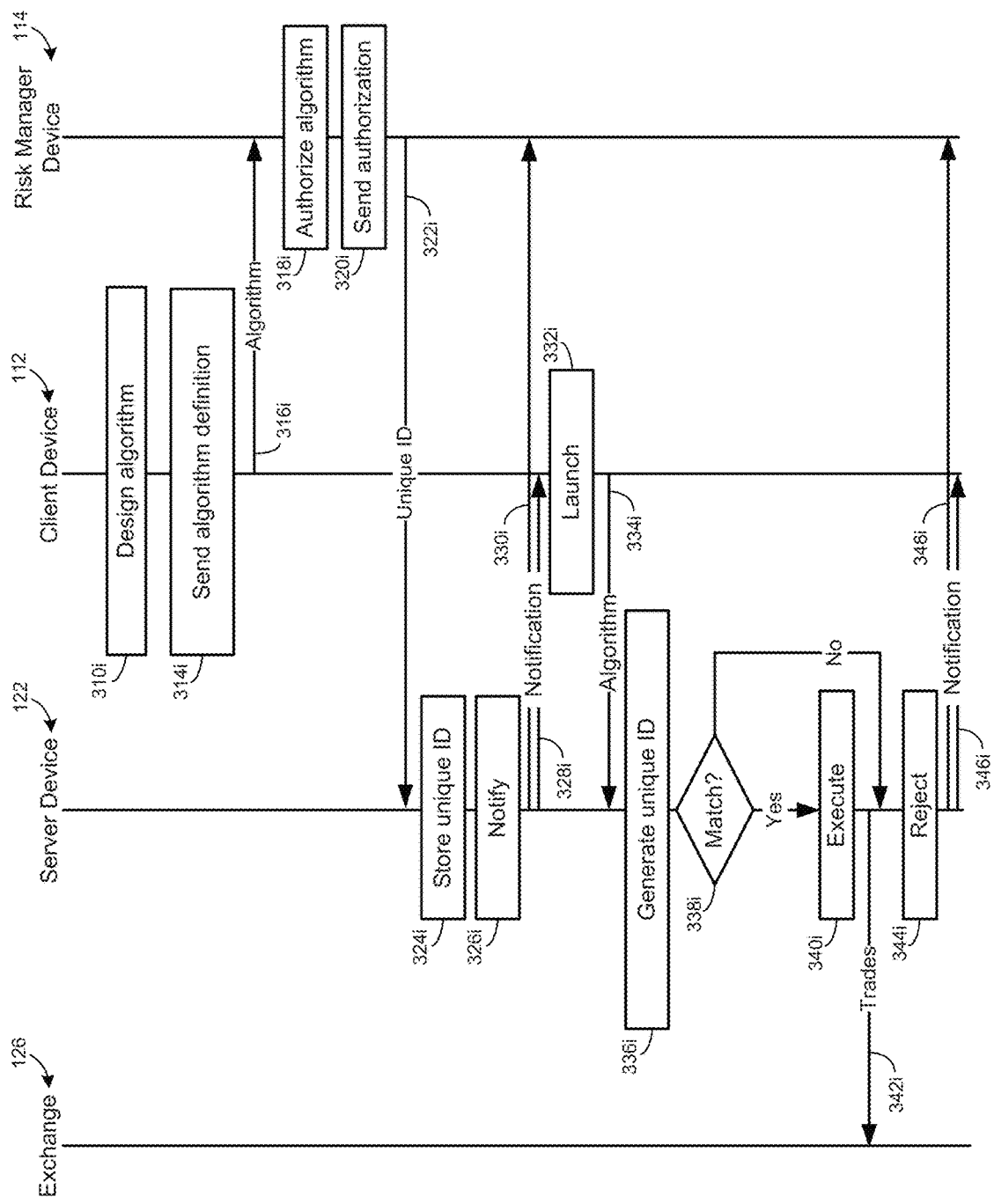

FIG. 3I shows an example method for authorizing a trading algorithm. In the example method disclosed in FIG. 3I, at the client device 112, the trading algorithm is designed (block 310i) and the trading algorithm definition is sent to the risk manager device (block 314i and arrow 316i). At the risk manager device 114, the trading algorithm is authorized (block 318i). Authorization may include generating a unique identifier. For example, the risk manager device 114 may generate a hash for the trading algorithm. The authorization is sent to the server device 122 (block 320i and arrow 322i). For example, the hash associated with the trading algorithm is sent to the server device 122.

At block 324i, the server device 122 stores the received unique identifier. The unique identifier may be stored in a list of unique identifiers that have been approved. The list may be specific to a trader or a general list of approved unique identifiers (e.g., non-trader specific). For example, the server device 122 may store the hash. At block 326i, the server device 122 notifies the user of the client device 112 and/or the risk manager device 114 that the server device 122 has received and stored the unique identifier (arrows 328i and 330i). It is noted that notification may be optional. For example, a user may select whether to receive a notification. The notification to the risk manager device 114 may be a confirmation that the unique identifier was stored on the server device 122.

At block 332i, the user of the client device 112 launches the trading algorithm. Launching the trading algorithm may include sending information related to a trading algorithm to a server device. When launching the trading algorithm, the client device 112 sends the trading algorithm to the server device 122 (arrow 334*i*). At block 336*i*, the server device 122 generates a unique identifier based on the received trading algorithm. For example, using the trading algorithm, the server device 122 may generate a hash for the trading algorithm. The hash may be generated based on the trading algorithm, trading algorithm definition, or programming code. The same hash function that the risk manager device 114 may be used when generating the unique identifier. Also at block 336*i*, the server device 122 may check the generated unique identifier. Checking the unique identifier may include storing the unique identifier.

At block 338*i*, the server device 122 compares the unique identifiers to determine whether unique identifiers at least substantially match. Checking may include comparing the unique identifier generated at block 336*i* to a list of approved (e.g., authorized) unique identifiers stored on the server device 122. For example, the server device 122 may compare a hash that was generated by the server device 122 based on the programming code sent from the client device 112 to a list of approved hash codes that were transmitted from the risk manager device 114. If the unique identifiers at least substantially match, then at block 340*i*, the server device 122 executes programming code corresponding to the trading algorithm. Arrow 342*i* represents information (for example, trades) being exchanged between the server device 122 and the exchange 126. If, however, the unique identifiers do not at least substantially match, then at block 344*i*, the server device 122 does not execute the programming code corresponding to the trading algorithm. Additionally, the server device 122 notifies one or more of the user of the client device 112 (arrow 346*i*) and the risk manager (arrow 348*i*) that the server device 122 has not executed the programming code.

J. Example 9

Figure 3J:
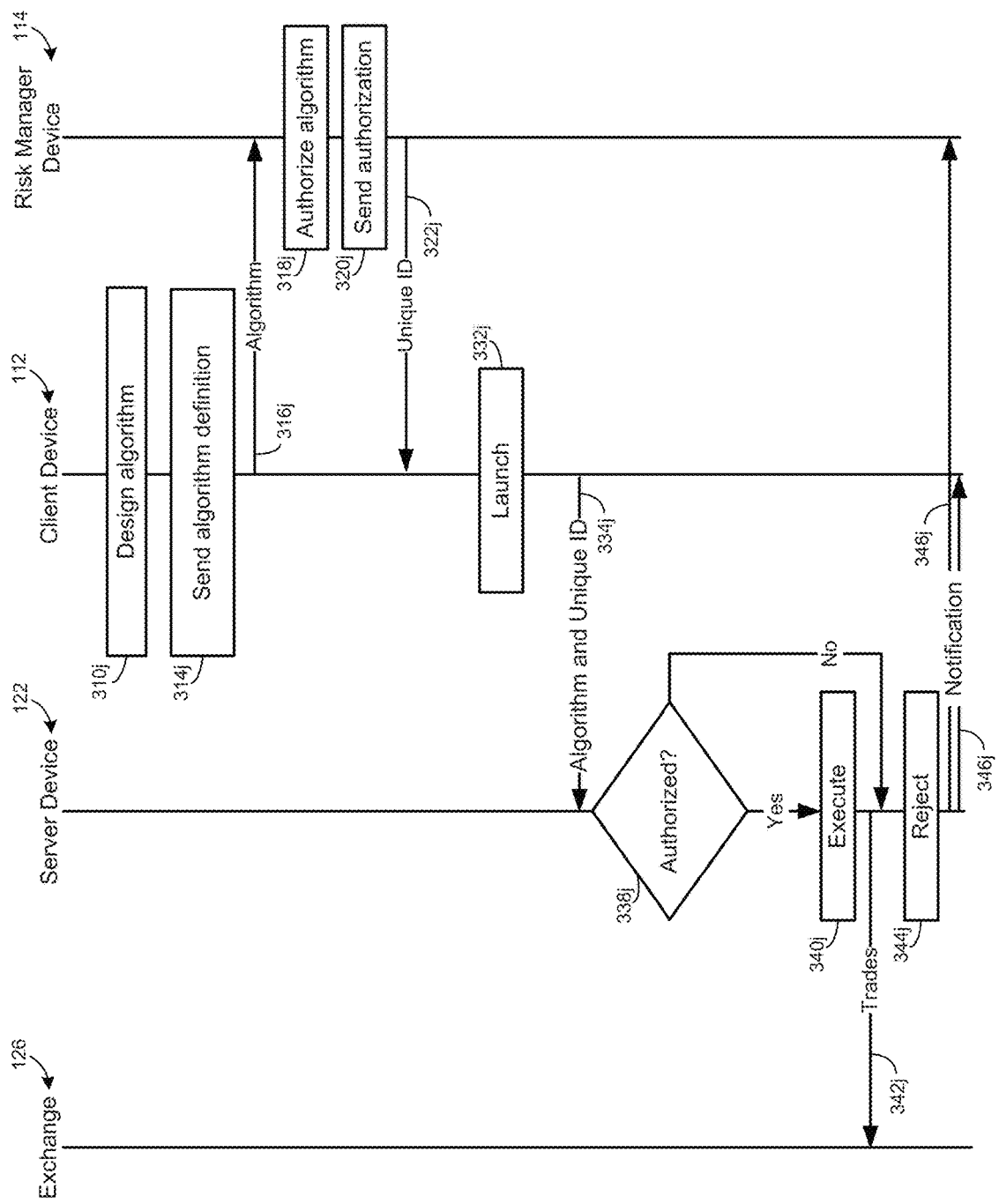

FIG. 3J shows an example method for authorizing a trading algorithm. In the example method shown in FIG. 3J, the risk manager device 114 does not send the unique identifier to the server device 122 directly.

In the example method disclosed in FIG. 3J, at the client device 112, the trading algorithm is designed (block 310*j*) and the trading algorithm definition is sent to the risk manager device (block 314*j* and arrow 316*j*). At the risk manager device 114, the trading algorithm is authorized (block 318*j*). Authorization may include generating a unique identifier. For example, the risk manager device 114 may generate a unique identifier that includes or is associated with a digital signature or a cryptographic key. A digital signature is a mathematical scheme for demonstrating the authenticity of a digital message or document. A valid digital signature gives a recipient reason to believe that the message was created by a known sender, and that it was not altered in transit. Digital signatures may be used for software distribution, financial transactions, and in other cases where it is important to detect forgery or tampering. The digital signature may be applied directly to the trading algorithm or trading algorithm definition. A cryptographic key may be used to detect the recipient. A cryptographic key may be applied to the trading algorithm or trading algorithm definition. The authorization is sent to the client device 122 (block 320*j* and arrow 322*j*). In addition to be transmitted alone, the unique identifier may be transmitted in the trading algorithm or trading algorithm definition. For example, the risk manager device 114 may transmit the trading algorithm including the digital signature or the cryptographic key.

At block 332*j*, the user of the client device 112 launches the trading algorithm. Launching the trading algorithm may include sending information related to a trading algorithm to a server device. When launching the trading algorithm, the client device 112 sends the trading algorithm and unique identifier to the server device 122 (arrow 334*j*).

At block 338*j*, the server device 122 determines whether the trading algorithm has been authorized by the risk manager. Determining whether the trading algorithm has been authorized may include checking the unique identifier. For example, the digital signature may be examined to determine the whether the risk manager signed the trading algorithm. In another example, the server device may ensure that the proper key is associated with the trading algorithm. If the unique identifier has been authorized, then at block 340*j*, the server device 122 executes programming code corresponding to the trading algorithm. Arrow 342*j* represents information (for example, trades) being exchanged between the server device 122 and the exchange 126. If, however, the unique identifier has not been authorized, then at block 344*i*, the server device 122 does not execute the programming code corresponding to the trading algorithm. Additionally, the server device 122 notifies one or more of the user of the client device 112 (arrow 346*j*) and the risk manager (arrow 348*j*) that the server device 122 has not executed the programming code.

V. Example Trading Algorithm Design and Authentication Tools

Figure 4:
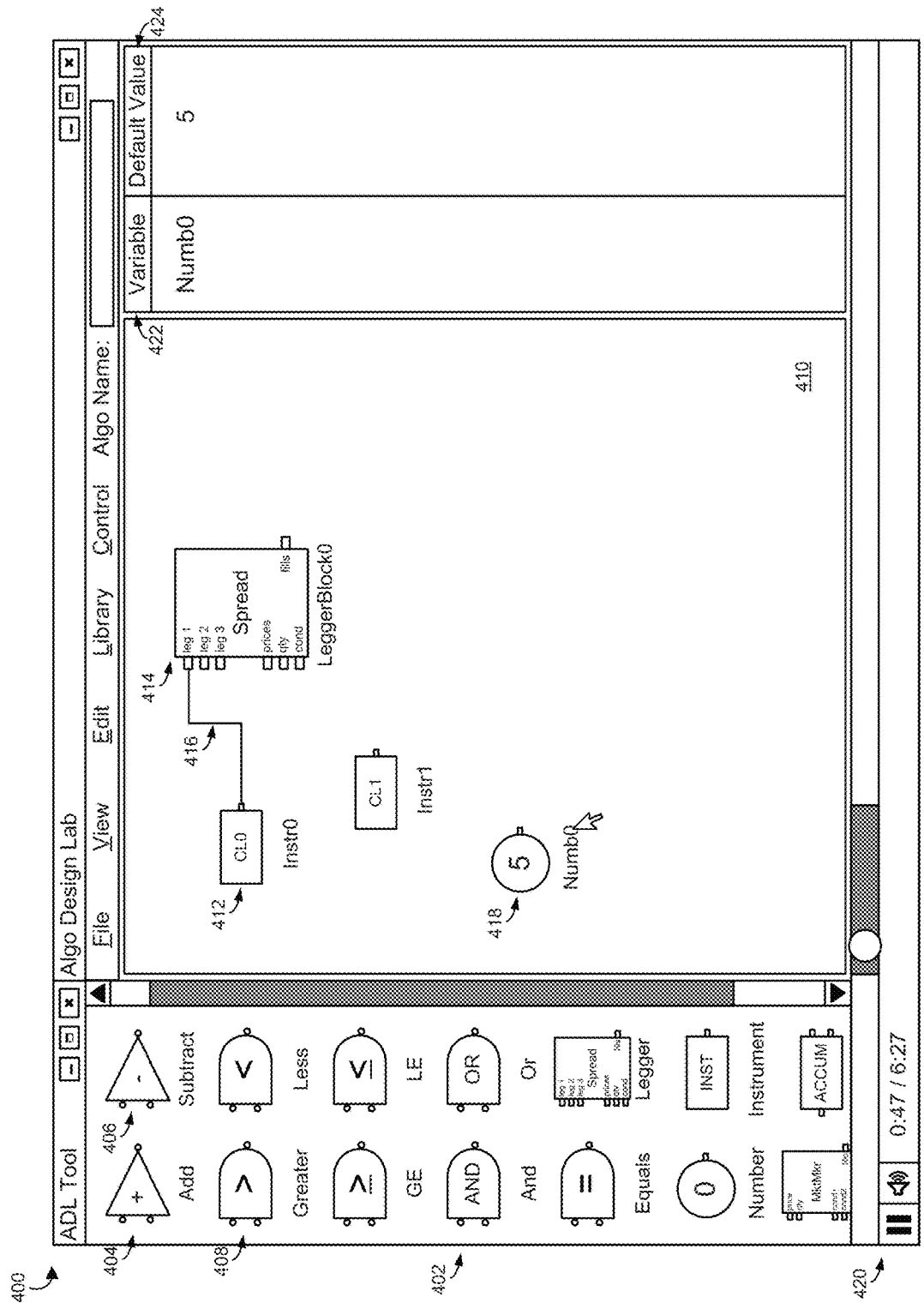
FIG. 4 illustrates an aspect of an example trading algorithm design application.

FIG. 4 is a screenshot associated with an example user interface 400 generated in association with the example trading algorithm design application 116 of FIG. 1. The trading algorithm design interface 400 shown in FIG. 4 is an example of a visual design interface such as ADL.

The example trading algorithm design interface 400 includes a tool portion 402, a trading algorithm definition portion 410, and a simulation controls portion 420. A user (for example, a trader) may use the trading algorithm design interface 400 to design a trading algorithm.

As shown in FIG. 4, the tool portion 402 includes several blocks, such as, for example, an add block 404, a subtract block 406, and a greater than block 408. Each of the blocks in the tool portion 402 corresponds to one or more algorithmic functions. For example, the add block 404 may receive two inputs, add them, and produce an output. A user may select a block in the tool portion 402 and drag that block into the trading algorithm definition portion 410 to add the functionality of that block to a trading algorithm. For example, the user of the trading algorithm design software 400 shown in FIG. 4 has added two instrument blocks, a number block, and a legger block to the trading algorithm definition portion 404. The user may define relationships between blocks added to the trading algorithm definition portion 410 by selecting a port of a block and then selecting a port of another block. For example, the user has coupled the output of one of the instrument blocks 412 to an input of the legger block 414. Line 416 illustrates that coupling.

One or more of the blocks from the tool portion 402 may be designated as variable blocks. For example, the number block 418 in the trading algorithm definition portion 410 has been designated as a variable block, as illustrated in the variable column 422 to the right of the trading algorithm definition portion 410. In addition, certain of the blocks from the tool portion 402 may be given a default value. For example, the number block 418 has been given a default value of five, as illustrated in the default value column 424 to the right of the trading algorithm definition portion 410. In other words, when the trading algorithm corresponding to the shown trading algorithm definition is executed, the trading algorithm will have a variable called "Numb0" that has a default value of five.

Using the example trading algorithm design interface 400 of FIG. 4, a user may design a trading algorithm and/or trading algorithm definition, name it, and save it to a computing device (for example, the client device 112). As disclosed above, in some examples, the saving of the trading algorithm definition may prompt the client device 112 to generate a unique identifier.

Figure 5A:
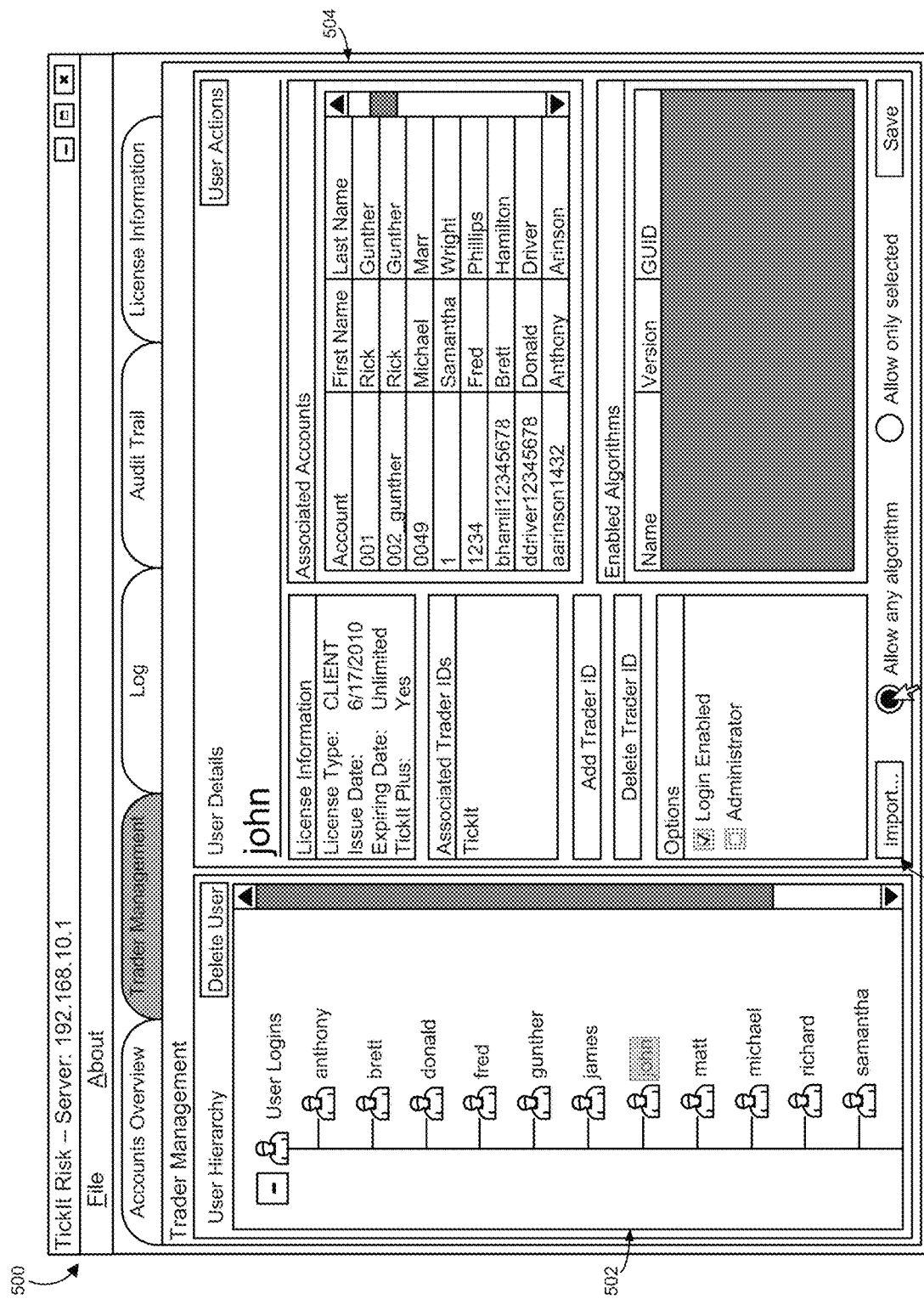
FIGS. 5A-5B illustrate an aspect of an example trading algorithm authorization application.
Figure 5B:
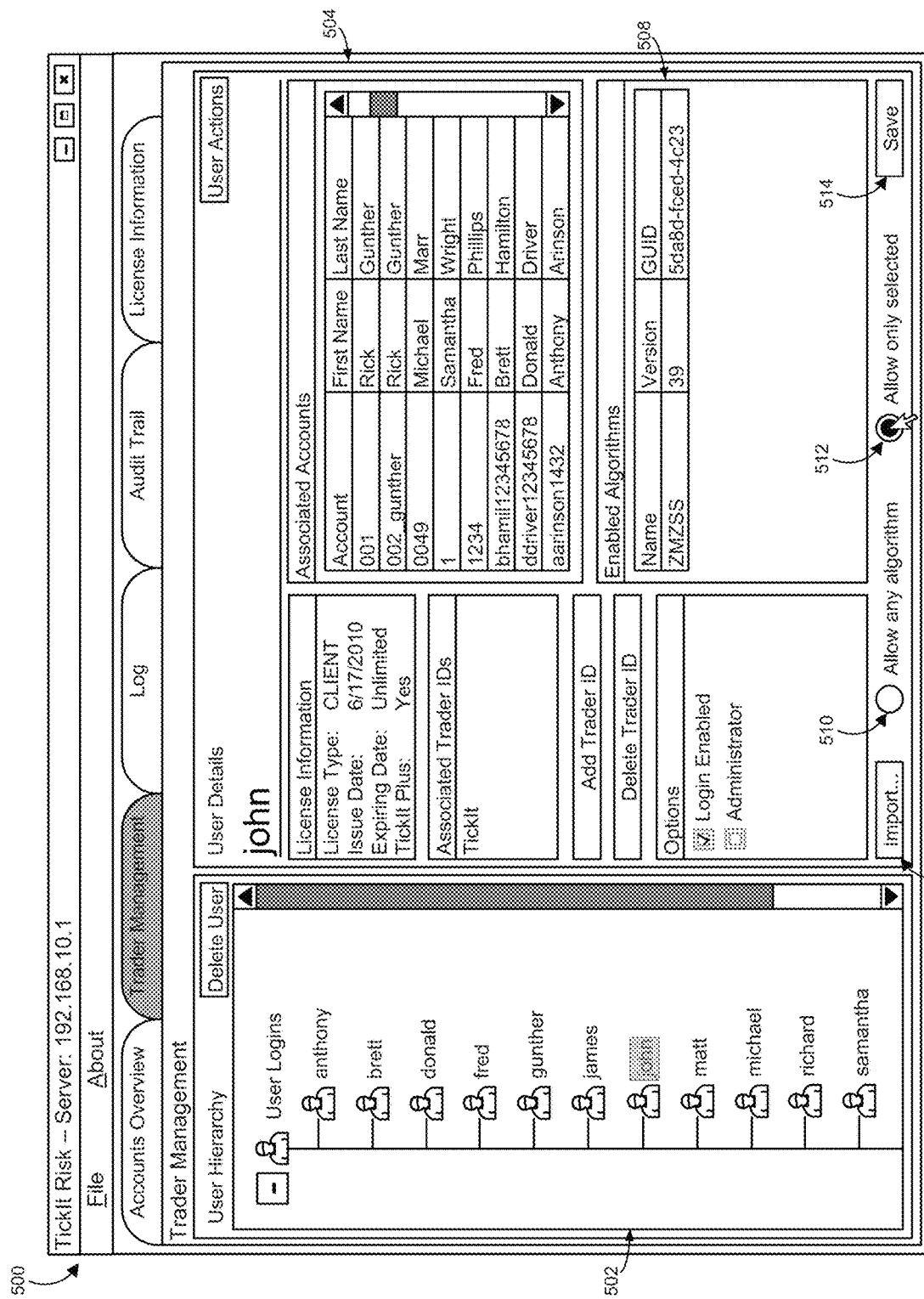

FIGS. 5A-5B are screenshots of an example trading algorithm authentication interface 500 associated with an authentication application running on the risk manager device 114. The example authentication interface 500 enables a risk manager to review and/or authenticate one or more trading algorithms. The example authentication interface 500 includes a user list portion 502 and a user details portion 504. The example user list portion 502 of FIG. 5A identifies one or more users (for example, traders) through one or more corresponding selectable icons. As indicated by highlighting in FIG. 5A, the risk manager has selected the user "john" on the example interface 500.

The example user details portion 504 includes information about a user selected in the user list portion 502 (for example, john) and one or more options related to the selected user. For example, using an import button 506, the risk manager may open a list of trading algorithm definitions associated with the selected user. FIG. 5B shows the authentication interface 500 of FIG. 5A after the risk manager imports a trading algorithm definition using the import button 506. As shown in an enabled trading algorithms box 508 of FIG. 5B, the risk manager has imported version seven of a trading algorithm definition called "ZMZSS". The GUID (5da8d-fced-4c23) of this trading algorithm definition, which is shown in the enabled trading algorithms box 508, serves as the unique identifier of the trading algorithm. However, the unique identifier need not be shown in some examples. After the risk manager approves the trading algorithm definition ZMZSS, the corresponding unique identifier may be uploaded to a list of approved unique identifiers associated with the trader account "john". In FIG. 5B, only one trading algorithm definition has been shown. However, the enabled trading algorithms box 508 may contain multiple trading algorithm definitions, in which case the risk manager may use an "allow any algorithm" dialog 510 and/or an "allow only selected" dialog 512 to approve one or more desired trading algorithm definitions. A save button 514 enables the risk manager to save the desired configuration.

Figure 6:
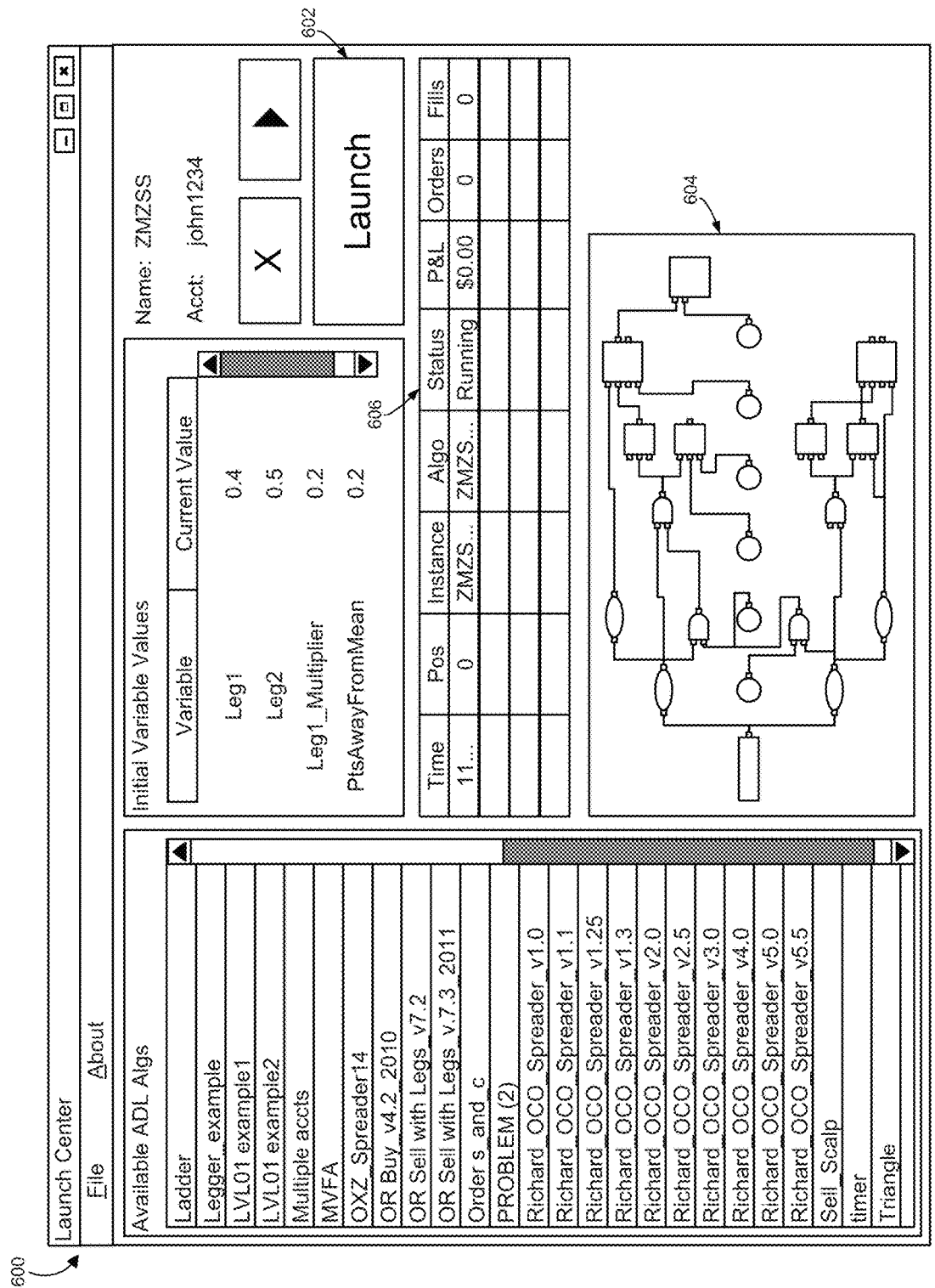
FIG. 6 illustrates an aspect of the example trading algorithm design application of FIG. 4.

FIG. 6 shows a screenshot of an example trading algorithm launching interface 600 that a user (for example, a trader) may use to facilitate execution of programming code corresponding to a trading algorithm. The launching interface 600 may be a different module of the design interface 400 (shown, in part, in FIG. 4). Alternatively, the launching interface 600 may be independent of the example design interface 400 of FIG. 4.

As shown in FIG. 6, the user has loaded the trading algorithm definition "ZMZSS", for which the account "john1234" has been authorized to execute. Using a launch button 602, the user may attempt to launch programming code corresponding to the trading algorithm definition. A graphical view of the trading algorithm definition is shown in box 604. The user may select box 604 to expand a graphical view of the trading algorithm definition and/or edit the trading algorithm definition. However, as disclosed above, if the user edits the trading algorithm definition, the user will be unable to execute it until a risk manager and/or third-party approve(s) the modified trading algorithm definition.

When the user selects the launch button 602, the programming code and unique identifier (for example, the GUID shown in FIG. 5B) are sent to the server device 122. However, as disclosed above, various other combinations of information may be sent to the server device 122. For example, the programming code may already have been sent to the server device 122 (for example, by the risk manager device 114), in which case the client device 122 need only send the unique identifier to the server device 122. If the server device 122 determines that there is an at least partial match between the sent unique identifier and the unique identifier stored to the server device 122, then the trading algorithm is confirmed and the server device 122 may execute the programming code. As shown in FIG. 6, in a status column 606, the trading algorithm is running, indicating that the server device 122 confirmed the trading algorithm and that the server device 122 is executing the programming code corresponding to the trading algorithm.

Figure 7:
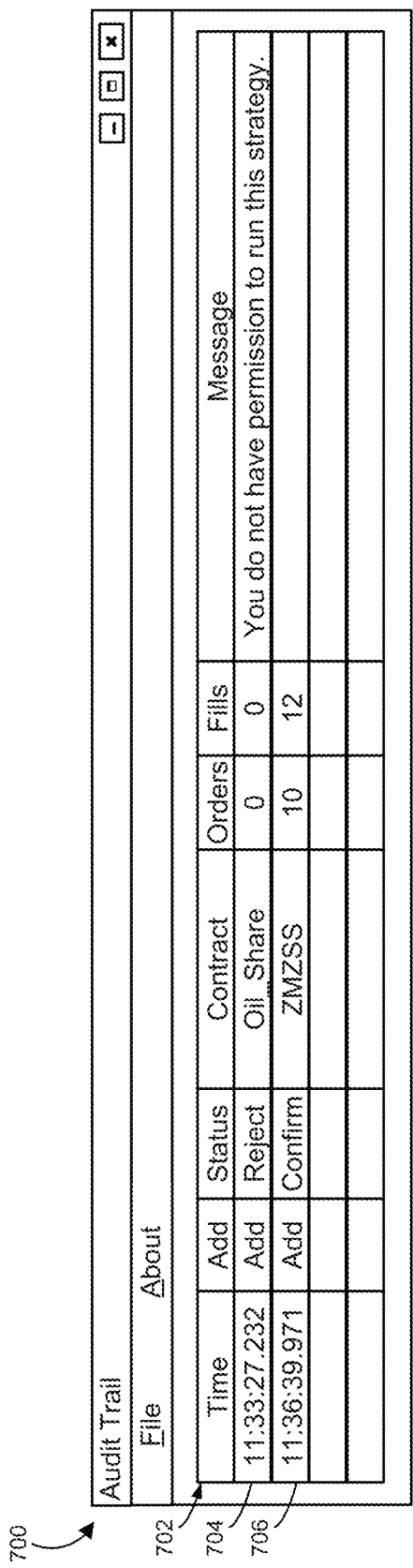
FIG. 7 illustrates an aspect of the example trading algorithm design application of FIG. 4.

FIG. 7 shows a screenshot of an application window 700 that a user (for example, a trader) of the client device 112 may use to determine an operating status of one or more trading algorithms. The application window 700 may, for example, be a part of the trading algorithm design application 116 or the trading application(s) 118 (shown in the example of FIG. 1). As shown, the application window 700 includes a table 702 listing two trading algorithms, one in each of rows 704 and 706. The trading algorithm in row 704, "Oil_Share", has been rejected by the server device (for example, the server device 122) because the user attempting to run that trading algorithm does not have permission to run that trading algorithm. However, the trading algorithm in row 706, "ZMZSS", has been confirmed by the server device (for example, the server device 122), as discussed above; therefore, the status of that trading algorithm in row 706 appears as "Confirm".

VI. Example Computing Device(s)

A computing device may include a processor and memory. A processor may be a general processor, digital signal processor, application specific integrated circuit, field programmable gate array, analog circuit, digital circuit, combinations thereof, or other now known or later developed processors. A processor may be a single device or a combination of devices, such as associated with a network or distributed processing. Any of various processing strategies may be used, such as multi-processing, multi-tasking, parallel processing, or the like. Processing may be local, as opposed to remote. However, processing can be performed remotely. Processing may be moved from one processor to another processor. A processor may be responsive to logic encoded in tangible media, which may be non-transitory. The logic may be stored as part of software, hardware, integrated circuits, firmware, micro-code or the like.

The memory may be computer readable storage media. Computer readable storage media may include various types of volatile and non-volatile storage media, including but not limited to random access memory, read-only memory, programmable read-only memory, electrically programmable read-only memory, electrically erasable read-only memory, flash memory, magnetic tape or disk, optical media and the like. The memory may be a single device or combinations of devices. The memory may be adjacent to, part of, programmed with, networked with and/or remote from processor.

The processor may be operable to execute logic encoded in one or more tangible media, such as the memory. Logic encoded in one or more tangible media for execution may be instructions that are executable by the processor and that are provided on the computer-readable storage media, memories, or a combination thereof. One or more of these media may comprise, contain, and/or store one or more such executable instructions. The processor may be programmed with and execute the logic. The functions, acts or tasks illustrated in the figures or described herein may be executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination.

Figure 8:
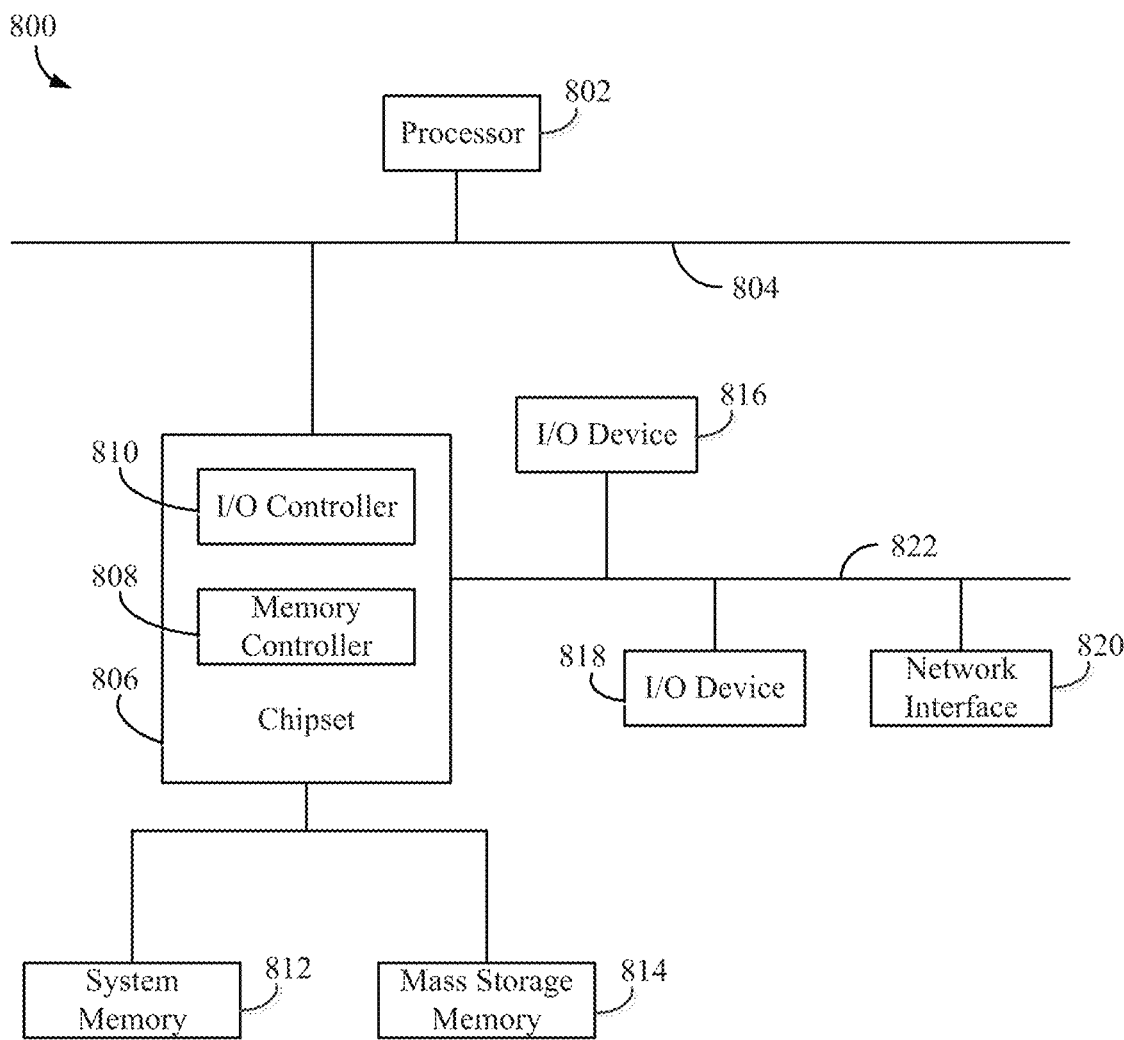
FIG. 8 illustrates a block diagram of an example computing device that may be used to implement the described examples.

FIG. 8 is a block diagram of an example computing device 800 that may be used to implement the disclosed examples. The computing device 800 may include additional, different, or fewer components.

The computing device 800 includes a processor 802 that is coupled to an interconnection bus 804. The processor 802 may be any suitable processor, processing unit, or microprocessor. The computing device 800 may be a multi-processor system and, thus, may include one or more additional processors that are communicatively coupled to the interconnection bus 804.

The processor 802 of FIG. 8 is coupled to a chipset 806, which includes a memory controller 808 and an input/output (I/O) controller 810. As is well known, a chipset typically provides I/O and memory management functions as well as a plurality of general purpose and/or special purpose registers, timers, etc. that are accessible or used by one or more processors coupled to the chipset 806. The memory controller 808 performs functions that enable the processor 802 (or processors if there are multiple processors) to access a system memory 812 and a mass storage memory 814.

The processor 802 may be operable to execute logic encoded in one or more tangible media, such as the system memory 812, mass storage memory 814, and/or network device 820. As used herein, logic encoded in one or more tangible media includes instructions that are executable by the processor 802 and/or a different processor. The logic may be stored as part of software, hardware, integrated circuits, firmware, and/or micro-code. The logic may be received from an external communication device through a communication network connected to the Internet. The processor 802 may execute the logic to perform the disclosed functions, acts, or tasks.

The system memory 812 may include any desired type of volatile and/or non-volatile memory such as, for example, static random access memory (SRAM), dynamic random access memory (DRAM), flash memory, read-only memory (ROM), etc. The mass storage memory 814 may include any desired type of mass storage device including hard disk drives, optical drives, tape storage devices, etc. The system memory 812 and the mass storage memory 814 may be a single memory module.

The I/O controller 810 performs functions that enable the processor 802 to communicate with peripheral input/output (I/O) devices 816 and 818 and a network interface 820 through an I/O bus 822. The I/O devices 816 and 818 may be any desired type of I/O device such as, for example, a keyboard, a video display or monitor, a mouse, etc. The network interface 820 may be, for example, an Ethernet device, an asynchronous transfer mode (ATM) device, an 802.11 device, a DSL modem, a cable modem, a cellular modem, etc. that enables the computing device 800 to communicate with another computing device.

While the memory controller 808 and the I/O controller 810 are depicted in FIG. 8 as separate blocks within the chipset 806, the functions performed by these blocks may be integrated within a single semiconductor circuit or may be implemented using two or more separate integrated circuits. One or more of the components of the computing device 800 may be implemented as a system on a chip (for example, a system on a chip in a mobile platform).

While examples have been disclosed, various changes may be made and equivalents may be substituted. In addition, many modifications may be made to adapt a particular situation or material. Therefore, it is intended that the disclosed technology not be limited to the particular examples disclosed, but will include all examples falling within the scope of the appended claims.

The invention claimed is:

1. A computer readable medium having stored therein instructions executable by a processor, including instructions executable to:
   receive a trading algorithm definition corresponding to a trading algorithm, the trading algorithm having a plurality of variable parameters;
   in response to the received trading algorithm definition:
      generate programming code representing the trading algorithm;
      generate a unique identifier identifying at least both the programming code representing the trading algorithm and a trader authorized to execute the programming code, wherein the unique identifier is modified in response to a change to the trading algorithm;
      send the unique identifier and the generated programming code representing the trading algorithm to an algorithm server operable to execute programming code, and
      store the unique identifier sent to the algorithm server and the generated programming code representing the trading algorithm;
   receive a user input that authorizes the trading algorithm definition for execution on the algorithm server;
   in response to the received user input, launch the programming code representing the trading algorithm;
   receive a parameter range for at least one parameter of the plurality of variable parameters;
   subsequent to the launch of the programming code representing the trading algorithm, receive a modifications to the programming code representing the trading algorithm, wherein the modification to the programming code including a change to the at least one parameter;
   in response to the received modifications to the programming code representing the trading algorithm, compare the change to the at least one parameter to the parameter range;
   in response to the compared change to the at least one parameter to the parameter range, determine that the unique identifier stored at the algorithm server has not been modified;
   in response to the determination that the change to the at least one parameter is within the parameter range and the unique identifier has not been modified, execute, by the algorithm server, at least the modifications to the programming code including the change to the at least one parameter; and in response to the determination that the change to the at least one parameter is not within the parameter range and the unique identifier has not been changed, prevent the modifications to the code from being executed.

2. The computer readable medium of claim 1, wherein the unique identifier is a certificate generated on a risk manager device, and wherein the sent unique identifier includes the certificate from the risk manager device to be accessed by a user of a client computing device.

3. The computer readable medium of claim 2, wherein the certificate is generated using at least one of the unique identifier, the trading algorithm definition, the trading algorithm, or programming code corresponding to the trading algorithm.

4. The computer readable medium of claim 1, further including instructions executable to send, in response to received the user input, a trader identifier to be associated with the programming code representing the trading algorithm and with a trader authorized to execute the programming code.

5. The computer readable medium of claim 1, wherein the unique identifier and at least one of the trading algorithm definition, the trading algorithm, or programming code associated with the trading algorithm are sent from a risk manager device to an authentication device as a first-level authentication, and the authentication device is to provide a second-level authentication to the algorithm server.

6. The computer readable medium of claim 1, further including instructions executable to store the received trading algorithm definition.

7. The computer readable medium of claim 1, further including instructions executable to send a notification to be accessed by a user of the trading algorithm design interface, indicating that the trading algorithm has been authorized for execution.

8. The computer readable medium of claim 1, wherein the unique identifier is at least one of a hash value, a trader identifier, or a globally unique identifier.

* * * * *